US010498542B2

(12) United States Patent
Ebrahimi et al.

(10) Patent No.: US 10,498,542 B2
(45) Date of Patent: *Dec. 3, 2019

(54) ELECTRONIC IDENTIFICATION VERIFICATION METHODS AND SYSTEMS WITH STORAGE OF CERTIFICATION RECORDS TO A SIDE CHAIN

(71) Applicant: ShoCard, Inc., Cupertino, CA (US)

(72) Inventors: Armin Ebrahimi, Cupertino, CA (US); Gaurav Khot, Cupertino, CA (US)

(73) Assignee: ShoCard, Inc., Cupertino, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/893,479

(22) Filed: Feb. 9, 2018

(65) Prior Publication Data
US 2018/0227131 A1    Aug. 9, 2018

Related U.S. Application Data

(63) Continuation of application No. 15/890,333, filed on Feb. 6, 2018.

(Continued)

(51) Int. Cl.
*H04L 29/06* (2006.01)
*H04L 9/32* (2006.01)
*H04L 9/06* (2006.01)
*G06Q 20/06* (2012.01)
*G06K 7/14* (2006.01)
*G06Q 20/38* (2012.01)
*G06F 7/58* (2006.01)

(52) U.S. Cl.
CPC .......... *H04L 9/3263* (2013.01); *G06K 7/1417* (2013.01); *G06Q 20/065* (2013.01); *G06Q 20/3827* (2013.01); *G06Q 20/38215* (2013.01);

*H04L 9/0643* (2013.01); *H04L 9/3236* (2013.01); *H04L 9/3247* (2013.01);
(Continued)

(58) Field of Classification Search
USPC ......................................................... 713/156
See application file for complete search history.

(56) References Cited

U.S. PATENT DOCUMENTS 7,502,467 B2 * 3/2009 Brainard ................. G06F 21/31
380/277
8,744,076 B2 * 6/2014 Youn ....................... H04L 9/002
380/28

(Continued)

OTHER PUBLICATIONS

Intl Search Report PCT/US18/17136, dated Apr. 26, 2018, 2 pages.

*Primary Examiner* — Amare F Tabor
(74) *Attorney, Agent, or Firm* — Penilla IP, APC

(57) ABSTRACT

Method of certification including receiving user data at a device of a certifying entity. The method includes generating a salt that is unique. The method includes hashing the data combined with the salt to create a generated hashed data. The method includes generating a certification record based on signing the generated hashed data using a private key of the certifying entity to create a signed certification of the data. The method includes hashing the certification record. The method includes transmitting the hashed certification record to a blockchain for storing. The method includes receiving a certification tx-ID of the hashed certification record. The method includes generating a certification data block including the certification record and the certification tx-ID. The method includes storing the certification data block to a side chain.

23 Claims, 19 Drawing Sheets

Related U.S. Application Data

(60) Provisional application No. 62/455,199, filed on Feb. 6, 2017, provisional application No. 62/596,434, filed on Dec. 8, 2017.

(52) U.S. Cl.
CPC ............ *H04L 9/3297* (2013.01); *G06F 7/588* (2013.01); *G06Q 2220/00* (2013.01); *H04L 2209/38* (2013.01)

(56) References Cited

U.S. PATENT DOCUMENTS

| | | | |
|---|---|---|---|
| 8,966,276 B2* | 2/2015 | Nanopoulos | G06F 21/31 713/183 |
| 9,608,822 B2* | 3/2017 | Lochmatter | H04L 9/3236 |
| 9,722,790 B2* | 8/2017 | Ebrahimi | H04L 9/3066 |
| 10,341,091 B2* | 7/2019 | Keranen | H04L 9/3226 |
| 2002/0071565 A1* | 6/2002 | Kurn | G06F 21/604 380/281 |
| 2002/0141593 A1* | 10/2002 | Kurn | H04L 9/083 380/286 |
| 2003/0070075 A1* | 4/2003 | Deguillaume | G06T 1/0042 713/176 |
| 2006/0256961 A1 | 11/2006 | Brainard et al. | |
| 2008/0235772 A1 | 9/2008 | Janzen | |
| 2016/0162897 A1 | 6/2016 | Feeney | |
| 2016/0330027 A1 | 11/2016 | Ebrahimi | |
| 2017/0103389 A1* | 4/2017 | Sorensen | G06Q 20/3829 |
| 2017/0344988 A1* | 11/2017 | Cusden | H04L 9/3247 |
| 2018/0144153 A1* | 5/2018 | Pead | G06F 21/6245 |

\* cited by examiner

Simplified Bitcoin Block Chain

ELECTRONIC IDENTIFICATION VERIFICATION METHODS AND SYSTEMS WITH STORAGE OF CERTIFICATION RECORDS TO A SIDE CHAIN

CROSS REFERENCE TO RELATED APPLICATIONS

This application is a continuation of and claims priority to and the benefit of U.S. patent application Ser. No. 15/890,333, filed on Feb. 6, 2018, entitled "Electronic Identification Verification Methods and Systems"; which claims priority to and the benefit of U.S. Provisional Patent Application Ser. No. 62/455,199, filed on Feb. 6, 2017, entitled "Electronic Identification Verification Methods and Systems"; and claims priority to and the benefit of U.S. Provisional Patent Application Ser. No. 62/596,434, filed on Dec. 8, 2017, entitled "Method And Systems For Creating And Decrypting A Secure Envelope Whose Sender Can Be Verified On The Blockchain"; all of which are hereby incorporated by reference in their entireties.

TECHNICAL FIELD

The present embodiments relate to methods, systems, and programs for managing the identify of users and of identifying those users to third parties, and more particularly, providing a certification of the identity of a user using a salt to obfuscate.

BACKGROUND

Identity theft causes tens of billions of dollars in losses every year. In an effort to combat identity theft, systems and methods for identifying users to third parties have been developed. In particular, user identity may be achieved through presentation of some form of identification card, such as a government issued ID. Further, a certification process may be performed to certify that form of identification. However, this certification process may not be secure as certifications may be discoverable, such that a certification may be associated with a particular user. Users may wish to keep valuable certifications secret.

It would be advantageous to have a more secure system and method for managing the identity of users and of identifying users to third parties, such as when certifying a user.

It is in this context that embodiments arise.

SUMMARY

The present embodiments relate to solving one or more problems found in the related art, and specifically to provide for login without requiring a user to enter a username and password. In particular, methods and systems are presented for certification of data previously registered to a blockchain, wherein the certification is obfuscated using a salt that is unique. It should be appreciated that the present embodiments can be implemented in numerous ways, such as a method, an apparatus, a system, a device, or a computer program on a computer readable medium. Several embodiments are described below.

In one embodiment, a method for certification is performed. The method includes receiving data of a user at a certification device of a certifying entity. The method includes receiving a registration tx-ID of the data, wherein the registration tx-ID is generated from a blockchain in response to receiving and storing a signed hash value of the data for registration. The signed hash value being signed using a private key of the user, and wherein the hash value of the data is generated using a registration hash algorithm. The method includes generating a salt that is random and/or unique. The method includes hashing the data combined with the salt using a certification hash algorithm to create a generated hashed data. The method includes signing the generated hashed data using a private key of the certifying entity to create a signed certification of the data. The method includes transmitting the signed certification of the data to a blockchain for storing. The method includes receiving a certification tx-ID of the signed certification of the data. The method includes writing the certification record to a side chain and hash of the data to a second blockchain. The method includes writing multiple certification records to a side chain and hash of each certification record combined in a separate box-car record and the hash of the box-car record written to a second blockchain and then the box-car record written to the side chain. The method includes the side-chain being a private or public blockchain. The method includes the second blockchain being a private or public blockchain.

In another embodiment, a method for certification is performed. The method includes receiving user data at a device of a certifying entity. The method includes generating a salt that is unique. The method includes hashing the data combined with the salt to create a generated hashed data. The method includes generating a certification record based on signing the generated hashed data using a private key of the certifying entity to create a signed certification of the data. The method includes hashing the certification record. The method includes transmitting the hashed certification record to a blockchain for storing. The method includes receiving a certification tx-ID of the hashed certification record. The method includes generating a certification data block including the certification record and the certification tx-ID. The method includes storing the certification data block to a side chain.

In still another embodiment, another method for certification is performed. The method includes generating a plurality of certification data blocks. Further, the generating for each certification data block includes: receiving data of a user at a certification device of a certifying entity; generating a salt that is unique; hashing the data combined with the salt to create a generated hashed data; signing the generated hashed data using a private key of the certifying entity to create a signed certification of the data that comprises a corresponding certification record; hashing the certification record to generate a corresponding hashed certification record; appending the hashed certification record to a list of hashes in a box car record; receiving a corresponding box car tx-ID for the hashed certification record; and writing the corresponding certification data block and the corresponding box car tx-ID to a side chain. The method further includes reaching a threshold of hashed certification records in the list of hashes. The method includes hashing the list of hashes. The method includes writing the hashed list of hashes to the blockchain. The method includes receiving list tx-ID from the blockchain. The method includes writing the list tx-ID to the box car record. The method includes writing the box car record including the hashed list of hashes and the list tx-ID to the side chain.

In another embodiment, a computer system is disclosed, wherein the computer system includes a processor and memory that is coupled to the processor, the memory having stored therein instructions that, if executed by the computer system, cause the computer system to execute a method. The method includes receiving user data at a device of a certifying entity. The method includes generating a salt that is unique. The method includes hashing the data combined with the salt to create a generated hashed data. The method includes generating a certification record based on signing the generated hashed data using a private key of the certifying entity to create a signed certification of the data. The method includes hashing the certification record. The method includes transmitting the hashed certification record to a blockchain for storing. The method includes receiving a certification tx-ID of the hashed certification record. The method includes generating a certification data block including the certification record and the certification tx-ID. The method includes storing the certification data block to a side chain.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIGS. 4B-1 and 4B-2 show a process for verifying hashed input data and a digital signature, in accordance with one embodiment of the present disclosure.

DETAILED DESCRIPTION

Figure 1A:
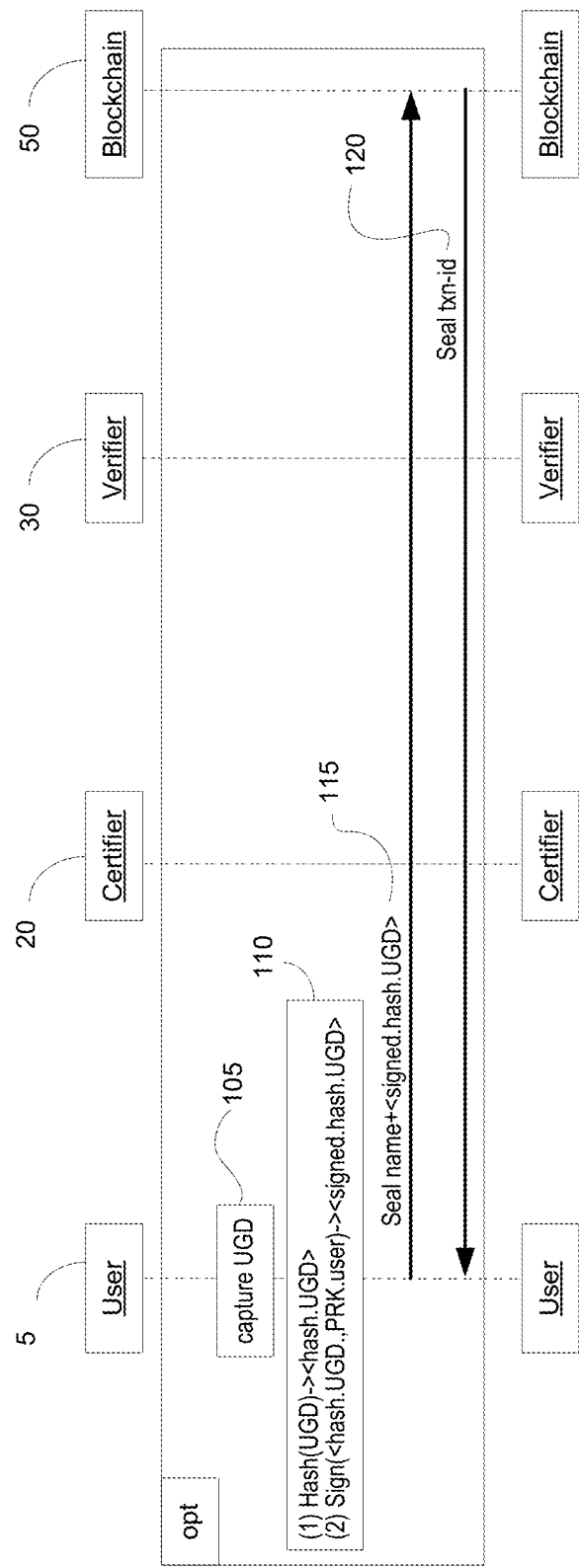
FIG. 1A illustrates a data flow for registering data in a blockchain, such as for registering user identification, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods that provide for authenticated login, registration, and call center validation. In particular, embodiments of the present invention allow users to login to websites, services and other portals without the use of usernames or passwords. Further, embodiments of the present invention allow users to remotely validate themselves such that a remote or local operator, such as those at a call center or a teller, can positively authenticate a user in order to gain access to their profiles and other information. Other embodiments of the present disclosure describe systems and methods that provide for certification of user generated data (e.g., biometrics), which can be used for authenticating a user, and for providing access based on the certification.

With the above general understanding of the various embodiments, example details of the embodiments will now be described with reference to the various drawings. Similarly numbered elements and/or components in one or more figures are intended to generally have the same configuration and/or functionality. It will be apparent, that the present embodiments may be practiced without some or all of these specific details. In other instances, well-known process operations have not been described in detail in order not to unnecessarily obscure the present embodiments.

Throughout parts of this specification, various terms are used with similar functionality and definition, unless otherwise defined, and are summarized below. For instance, the term "user" refers to an individual who has identifying credentials. The term "man-in-the-middle" refers to a system or individual listening to communication between two parties in either electronic or analog form. For example, the man-in-the-middle may be a hacker. The term "verifier" refers to a service which is configured to verify some or all of user information associated with a user. The term "certifier" refers to a person or service which is configured to certify the user information (which previously could have been verified and validated). The certifier is configured to produce a certification record, which uniquely further identifies data (e.g., user information), and can be used as proof that certain data belonged to a certain user at the time of the certification according to the certifier. The term "session ID" refers to a unique identifier that may be used throughout an authentication and login process, thereby connecting the devices used in the process, and wherein the session ID may be associated with a communication session that will be established after successful login of a corresponding user. The term "signature" refers to a process by which a user is able to digitally sign data using a public/private key pair. The process of signing data may be protected with access control to the App or device. For example, a Touch ID process previously introduced may be used as the user's permission to allow the App to digitally sign data on the user's behalf.

Registration, Validation, and Certification of Data

Embodiments of the present invention are based on an identity management platform implementing a technology layer that interacts with a blockchain. The blockchain securely holds data used for certifying identity transactions. In a traditional sense, a blockchain is a technology that forms the heart of the cryptocurrency, Bitcoin. In embodiments, the blockchain technology can be used by several integrated systems for purposes other than currency transactions, such as for identity management. There are various implementations of the blockchain beyond what is used in Bitcoin, including but not limited to Ethereum and Hyperledger, Litecoin, Bitcoin cash, stellar, etc. The blockchain can be a publicly viewable blockchain, such as Bitcoin, or it can be a private blockchain.

In one embodiment, registration (e.g., of a user) (also referred to as validation) is implemented with an identity manager using a blockchain. Further, a certification process may be processed for certifying the registration and/or validation. In one embodiment, to register a user, some form of user identification (e.g., a driver's license or passport) is scanned. One or more fields are extracted, such as your name, license number, passport number, date of birth (or other data), etc. Also, that identifying information can be gathered individually. Further, the identifying information can be gathered manually. Each field is then processed to produce a hash of the data. Optionally, to further obfuscate the original data, the hash can be produced of the original data along with a paired random data to prevent brute-force discovery of the hashed data; in this case, to validate the hash, the data and the random data (e.g., salt) must always be used together. In this example, the private key that is present on the mobile device can be used to create a digital signature of that hash. Each signature of the hash is paired with a name to form the sequence name=value where the value is the signature of the hash. The name field refers to the data type that is in the value. For example DOB=signed.hash(field+Salt) could refer to Date of Birth field with the value as described. In some embodiments, it may be desirable to obfuscate the name portion as well. In such a case, the name field can be appended with a Salt and then hashed. Using this method with the DOB example above, the resulting name=value would be: hash(DOB+Salt1)=signed.hash(field+Salt2). The above process repeats for every field. The signed hash value and optionally the public key of the user are stored to the blockchain; if the public key is not stored on the blockchain, it can be shared through other means when it is necessary to validate the digital signature. In one configuration, the various fields are put together in one record to create an ID (e.g., in the form of a seal) for that user.

The user can then provide the raw data along with the corresponding Salts (if Salts are used) with a public key and a pointer to that record on the blockchain in order to allow verification of the data by a third party. In particular, this provides a correlation between the data (e.g., the raw data) that the user has on the mobile device and what's on the blockchain. That is, the raw data that is newly presented may be verified using the data on the blockchain.

In still other embodiments, following the registration process, a user can be certified by some other trusted party, such as a bank or "know your customer" (KYC) checking company, which then can issue a certification for the user, based on the seal associated with the registration and validation of the user. By way of example, these certifiers can use their own private key to write the records on the blockchain, pointing to record entry of the user that is also on the blockchain. This certification may be referred to as the "User ID" (e.g., ShoCard ID issued by ShoCard, Inc.). As such, there are generally two steps: the first step is the registration process where hash signatures of the individual fields are sealed on the blockchain, and the second step is a certification of the sealed registration. The certifier does not necessarily sign all fields of a user's record. They will create a signature of the hash of the data-fields that are presented and they are able to verify or attest to. When hashing these fields, the $3^{rd}$ party certifier may optionally add a salt to each data-field before hashing it as well. More than one $3^{rd}$ party can certify a user, each certifying the user by signing their attestations using their own private key. This creates a multi-party certification of the user. The more certifiers that a user has, the greater web of trust that there will be in their identity and related attributes.

In still other embodiments, the platform providing registration and certification also provides for a secure workaround in cases when a bank suspects a credit card transaction could be fraudulent and wants to reject that transaction. The bank, for example, can send a notification/challenge (e.g., a secure notification), wherein the challenge looks for a response confirming the user, and the challenge also confirms that the user authorizes the current transaction. Additional features can include use of a biometrics for access-control (e.g., Touch ID). In one embodiment, each die the user's private key can be accessed to answer those questions. In one embodiment, by using the private key of the user when responding to questions (i.e., to see the data or questions), it is possible to avoid using clear text, which can ultimately be hacked.

Thus, embodiments of the present invention provide for being able to authenticate the user whenever the user does any kind of transaction, such as logging into a website, calling a call center, authenticating a transaction. In particular, the systems, methods, and technical operations described herein, and based on the identity management platform providing for registration and/or certification of data, can be implemented with the confidence of knowing who the user really is, and enabling this verification process in a timely manner.

The registration and/or validation process may be referred to as "sealing." Certification of the registration may be referred to as "certifying." In particular, sealing is the process of hashing and digitally signing the User ID data and storing it in the blockchain. Once it is sealed in the blockchain, the data becomes a permanent record. The data in the user ID may be changed, but the new data must be resealed in a new blockchain record. In one embodiment, no readable information is stored in the blockchain, only an indecipherable digital signature of a hash that can only be verified by producing the original data and the optional salt that was hashed and the user's public key. The user data is in control of the user and not available on the blockchain.

Certification of the registration and/or validation is the process of another party (e.g., third party, bank, airline, etc.) acknowledging the accuracy of the user ID that is registered, and marking that data (e.g., user ID) with a certification that can be recognized, such that the data can be recognized as being accurate when presented in the future, without having to see any other evidence of identity beyond the user ID. To certify a user ID, the certifier provides a user with a unique SessionID (e.g., via a QR Code that the user can scan). The user then signs the SessionID along with his/her raw data (e.g., user ID) and corresponding seal tx-ID on the blockchain and encrypts it with the public key of the certifier and delivers to the certifier. The certifier performs decryption using its corresponding private key and generates a new hash based on the newly presented raw data and then verifies the digital signature of the hash on the blockchain against the newly generated hash and the public key of the user. It also verifies that it can use the same public key to verify the signature of the hash of combined SessionID along with the user's raw data. If the verification process is a match, this proves that the user has the private key(s) that is used to create both records. If the certifier is satisfied that the user is as they represent, the certifier can create a new record (e.g., certification record) with their own private key(s) that references the user ID that is registered and stored in the blockchain. The certifier can also create a separate signature for each field that it is able to verify (e.g., user name, date of birth, etc.). In this case, each field is ultimately a key=value pair where the value is a digital signature of the hash of the data being certified signed with the private key of the certifier. In the future, when the user presents their user ID to a third party along with the pointer to the certification records, the third party can check the certification to make sure that the user is presenting the same user ID that was previously certified. In each reference of hashing data, optionally a Salt is added to the data before hashing to obfuscate the data further.

It should be understood that the embodiments and described use cases described herein are only by way of example. Many new use cases can be encompassed and facilitated by the functionality based on the technology and identity management platform implementing registration and/or certification of data. For instance, identity verification (e.g., verification of a registration and/or certification of data) can be integrated into various commercial applications, as well as private applications. Commercial applications may include those that require commercial entities to verify the identity of a user. Verifying the identity of a user can be required for achieving any number of functions, such as traveling, making transactions, banking, communication, loan verification, credit verification, purchase verification, and other uses. In other embodiments, private identity verification can also be facilitated using the methods, apparatus, computer readable media, and systems described herein. For example, private identity verification may be useful when a user wishes to prove their identity to another user in a fast and efficient manner. The systems and methods described herein write data to the blockchain database, which is non-rewritable and permanently maintains the record without compromise. This enables writing of information to the blockchain in a manner that can be verified by one or more transactions executed by methods of the present inventions.

Additionally, the systems and methods described herein may be executed with any number of computer systems. By way of example, the computer systems may include user devices, such as mobile phones, tablets, desktop computers, watch computers, head attached computers, eyeglasses computers, or combinations thereof. Server operations may also be performed and communicated between client devices, to facilitate transactions with the blockchain database, server storage, and the like. By way of example, these computer devices can communicate over networks, such as the Internet, local area networks, Bluetooth, Near Field Communication (NFC), or even via exchange of codes such as QR codes. The networks enable individual devices to transact with each other, such as by way of sending, receiving, and processing exchanged information. The exchanged information can include different types of encrypted data, hashed data, data envelopes, codes, QR codes, PDF417 codes, messages, notifications, and other types of data.

In embodiments, the messaging and communication functions described herein are provided to enable users to exchange data over communication networks in order to verify identity, or enable or provide access to users to services, goods, or commercial transactions. In the case of banking operations, the verification process can be utilized by banks, as well as users of the bank, or third parties that require certified information from the banks regarding those users. In the case of travel type verifications, different travel entities can require identification of users, and the identification can also be verified by themselves or by other third parties that are trusted. These operations can be facilitated using the systems, methods, computer readable media, and code that execute the verification processes. Broadly speaking, verification of a user identity (e.g., verification of the registration and/or certification of data, such as user ID) can be useful in any type of industry, or private setting. The use of verification is simply facilitated by using the verifying infrastructure, programs code, applications, and combinations thereof, to ensure that verification is secure.

In some embodiments, the verification systems can be embodied in an application, such as those that can be installed on mobile devices (e.g., Apps). By way of example, users wishing to have their identity verified can use an application to seal information regarding their identity. Once the data has been sealed (e.g., signed hashed data has been stored to the blockchain), this data (e.g., raw data) can be used for later certification by another party. The other party may also be utilizing a corresponding App or other applications on other devices, which enables efficient reading of the data, code, QR code, message, or notification, to validate the identity of the user.

In still other embodiments, code plug-ins can be integrated into commercial websites, which may use identity verification for different reasons or functions. For example, banks can install plug-in applications, code, or programs that can execute part or all of the verification processing to seal information and/or to certify information regarding identity. In view of the foregoing, it should be understood that the verifying processes described herein and the various use cases are only by way of example, and additional use cases will be evident to those skilled in the art.

Figure 1B:
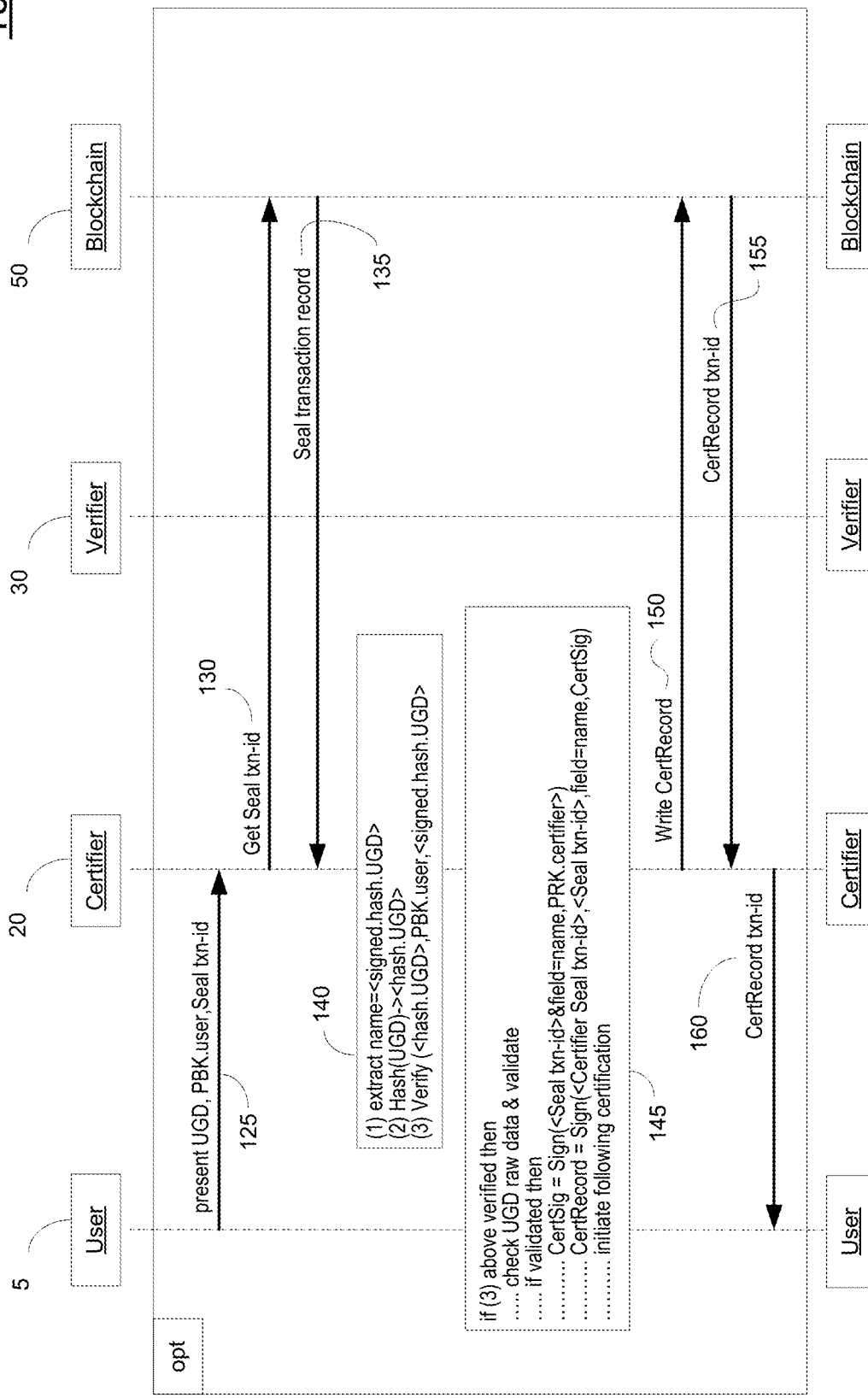
FIG. 1B illustrates a data flow for certifying the registered data using a blockchain, such as for certifying user identification that is registered with an identity manager, in accordance with one embodiment of the present disclosure.
Figure 1C:
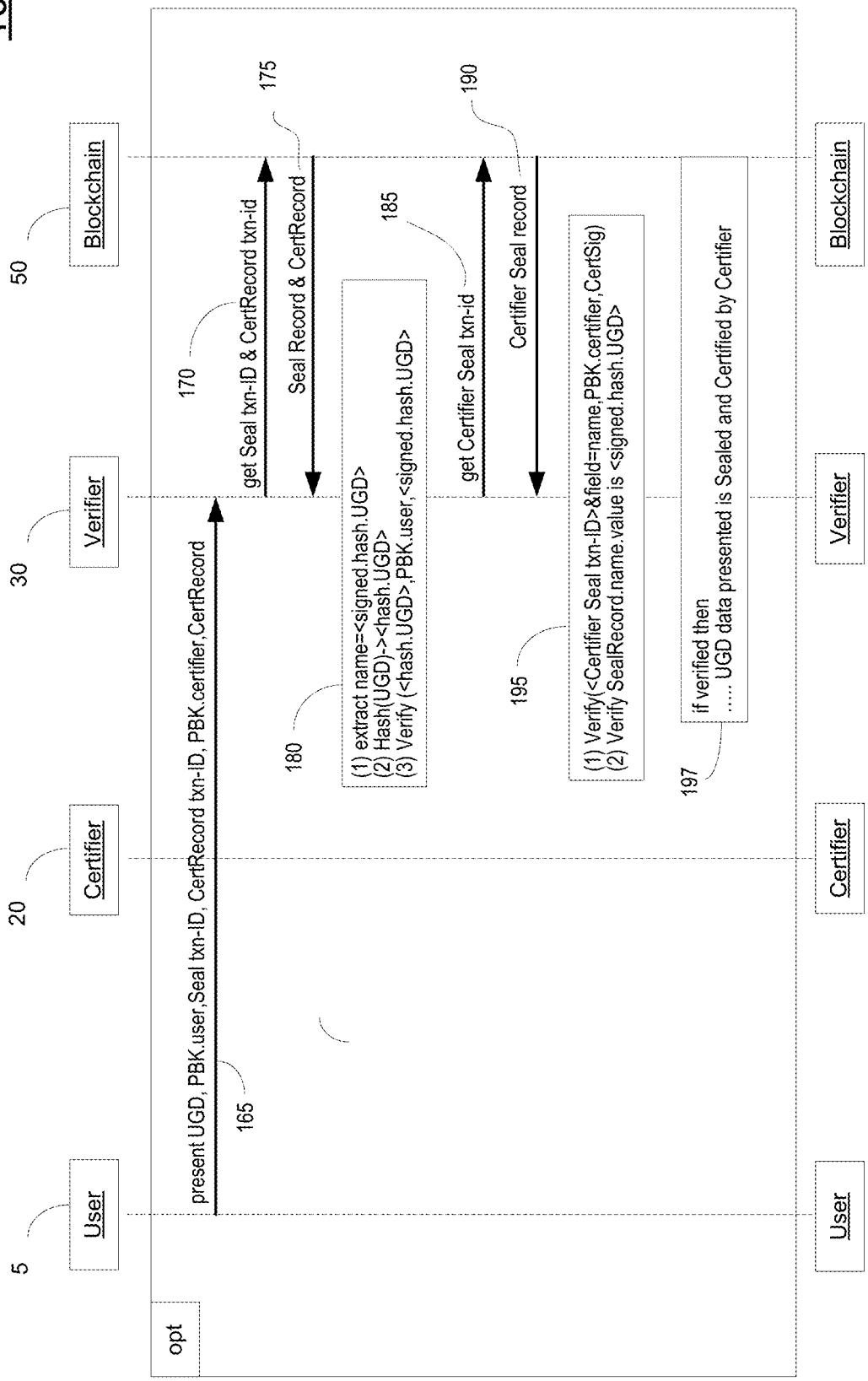
FIG. 1C illustrates a data flow for verifying the registered data, and for verifying the certification of the registered data, in accordance with one embodiment of the present disclosure

FIGS. 1A-1C show data flows for the registration and/or validation process as well as the certification of the registered data, for example, as implemented by the identity management platform described herein, in embodiments of the present invention. These processes are performed to facilitate the implementation of authenticated login, registration, call center validation, and certification of user generated data (e.g., biometrics).

In FIGS. 1A-1C and throughout the specification, the UGD may be combined with a corresponding salt value for added security, in accordance with one embodiment of the present disclosure. As such, in cases where the salt value is added, the UGD should be understood to include the salt value (UGD+Salt). For example, for the hash of UGD shown in FIGS. 1A-1C and throughout the specification should be modified to include the salt value, such that hash(UGD)→hash(UGD+Salt).

In particular, FIG. 1A illustrates a data flow 100A for registering data in a blockchain, such as for registering user identification, in accordance with one embodiment of the present disclosure. At operation 105, a user 5 may generate and/or capture any type of raw data (UGD) and have that data certified by a third party (e.g., certifier). There are no limitations as to the type of data generated. For example, the data can be any of the following types, but not limited only to these types of data: a simple text string; a date; an enumerated data type; a number; an arbitrary series of data bytes (e.g., a data block), a digital key, biometrics, etc. For distinction, the data types would have a name associated with them, so they appear in a key:value format (e.g., Name=Value).

This data can be saved locally on a device associated with the user 5 (e.g., mobile phone operating an identity management application). The user 5 would then seal her record by writing this data to a blockchain 50 in operation 115. This can be done by either inserting a new seal record with the added user generated data, that may overwrite any previous seal (if any), or a new seal that complements any prior seals.

The value field written to the blockchain is for registration and/or validation of the original, raw data only. The user 5 is expected to securely (e.g., through encryption) hold onto that data on their own private devices such as a mobile-phone and only share it when the user chooses to. Hence, the data is first hashed in operation 110 so the UGD becomes <hash.UGD>. In embodiments, any number of hashing algorithms can be used, such as SHA256. In addition, the user 5 then signs the <hash.UGD> with a private key of the user, producing <signed.hash.UGD> (e.g., using Touch ID). In operation 115, the signed hash becomes the value that is then written to the blockchain in the form: Name=<signed.hash.UGD>. More particularly, a seal 120 is generated that includes a transaction identifier for the blockchain that can be used to access the signed hash value (<signed.hash.UGD>) at the appropriate location in the blockchain. Optionally, the UGD field can be a combination of actual data plus a Salt value that is appended to the data and then hashed.

FIG. 1B illustrates a data flow 100B for certifying the registered data using a blockchain, such as for verifying raw data that is registered with an identity manager using a blockchain 50, and for certifying the raw data (e.g., user identification) that is registered, in accordance with one embodiment of the present disclosure. Once the record 120 is registered and sealed, at operation 125 the user 5 may then present the UGD (securely maintained by the user or another device storage of her choosing), along with her public-key and a pointer to the seal record 120 on the blockchain to another party. In one embodiment, the other party is a verifier 30 that performs operations to verify the UGD. In another embodiment, the other party is a certifier 20 that performs operations to certify the registered UGD. Operations 130 and 135 may be performed by the certifier 20 or verifier 30 for purposes of verifying the UGD that was previously registered, though these operations are shown as being performed by the certifier 20. In particular, at operation 130, a request to access the registered seal record 120 is made to the public blockchain 50, and at operation 135, the seal record 120 is returned to the certifier.

In block 140, operations are performed for verifying the UGD. In particular, the data stored in the blockchain 50 is extracted, namely the signed hash value (<signed.hash.UGD>). In addition, the newly presented UGD is hashed using the same hash algorithm that was performed when registering the data. Verification of the raw data (UGD) is performed by performing a verification process on input data including the newly generated hash value, the public key of the user, and the <signed.hash.UGD> stored on the blockchain 50. For purposes of illustration only, in the verification process, hash values of the UGD newly generated and based on the <signed.hash.UGD> (e.g., using the public key), may be compared, and is verified when the hash values match.

In block 145, the certifier 20 begins the certification process. In particular, validation of the raw data (UGD) is performed. For example, the raw data is inspected to see if it conforms to public form (e.g., follows the form of a driver's license), and is validated if the raw data as presented conforms with the public form. Then, the seal 120 (e.g., transaction identifier or txn-ID) along with the public key of the certifier 20, and any other suitable data, is signed using the private key of the certifier 20 to generate a certification signature. In one embodiment, the seal 120 and public key optionally may also be hashed. Data may be combined in a certification record that is signed (using the private key of the certifier 20) and sealed in a blockchain, wherein the data may include one or more of the seal 120 of the UGD (e.g., seal txn-ID, pointer to the blockchain), the raw UGD, the certification signature (as the raw data of the certification record), public key of certifier, etc. At operation 150, the certification record is sealed in the same or different blockchain 50, and in operation 155 the certification record seal including the pointer to the blockchain where the certification record is stored is returned to the certifier 20 for distribution. For example, the certification record seal is provided to the user 5 to offer as certifying proof of the UGD, as is described in FIG. 1C. When the certification record is given to the user, the raw fields (UGD) plus any corresponding Salts are also given to the user if the certifier wishes the user to freely share that certification with others.

In particular, FIG. 1C illustrates a data flow 100C for verifying the registered data, and for verifying the certification of the registered data, in accordance with one embodiment of the present disclosure. For example, at operation 165 the user 5 may present the raw UGD (and other information) to a third party, along with registration and certification record information, so that the third party may verify the UGD using multiple factors (e.g., registration and/or certification). That is, data may be combined for presentation, and includes one or more of the raw UGD, public key of the user 5, seal 120 of the UGD (e.g., seal txn-ID, pointer to the blockchain), the certification signature (as the raw data of the certification record), the certification record seal (e.g., certification seal txn-ID, pointer to blockchain), public key of certifier, etc. For purposes of illustration, the third party is verifier 30.

At operations 170 and 175, verifier 30 obtains the seal record 120 (e.g., using txn-ID for the blockchain) to obtain the data stored in the blockchain 50 (e.g., <signed.hash.UGD> and public key of user 5) to verify the raw data (UGD). At block 180, operations are performed to verify the data. For instance, the data stored in the blockchain 50 is extracted, namely the signed hash value (<signed.hash.UGD>). In addition, the newly presented UGD is hashed using the same hash algorithm that was performed when registering the data. Verification of the raw data (UGD) is performed by performing a verification process on input data including the newly generated hash value, the public key of the user, and the <signed.hash.UGD> stored on the blockchain 50. For purposes of illustration only, in the verification process, hash values of the UGD newly generated and that based on the <signed.hash.UGD> (e.g., using the public key), may be compared, and is verified when the hash values match.

When the hash values match, verification of the certification of the registered raw data (UGD) is performed. In particular, at operations 185 and 190, verifier 30 obtains the certification seal record (e.g., using certification seal txn-ID for the blockchain) to obtain the data stored in the blockchain 50 (same or different blockchain). That is, at operation 190 the certification record is returned to the verifier 30. At block 195, operations are performed to verify the certification record. In particular, the data stored in the blockchain 50 is extracted, namely the certification record which may be signed using the private key of the certifier 20 (e.g., signed hash value (<signed.certification record>). In addition, the newly presented certification record can be hashed using the same hash algorithm that was performed when sealing the certification record—however, the method of hashing needs to be known so it can be reproduced. Verification of the certification record is performed by performing a verification process on input data including the newly generated hash value, the public key of the certifier 20, and the <signed.certification record> stored on the blockchain 50. For purposes of illustration only, in the verification process, hash values of the UGD newly generated and hash values based on the <signed.hash.UGD> (e.g., using the public key), may be compared, and is verified when the hash values match. In addition, in block 195, verification of the raw data, UGD, may be performed if not already performed. In that manner, the verification has been performed on the UGD itself and a certification of the UGD. As such, upon successful verification of the UGD and certification record, at operation 197 the presented UGD is trustworthy after going through a verification of the UGD and the certification record of the UGD.

Certification of Data Through Obfuscation

In one embodiment, the certification process allows one entity (e.g., a certifying entity) to certify another entity, such as through corresponding data associated with the entity. The certification can contain one or both of the following, as previously described: data that is shared with the certifying entity, and/or unsolicited data that is typically generated by the certifying entity. The certification of data (e.g., personal data), such as through a certification record, allows a user to present the personal data along with the certification to a third party. In that manner, the personal data is more trustworthy having been examined and given a certification. In one implementation, the third party relies solely on the certification record to validate the personal data, especially when the third party fully trusts the certifying entity. In another implementation, the third party is able to verify the certification record, as previously described. Various use cases are provided below as examples of the use of a certification record when certifying data.

Figure 3A:
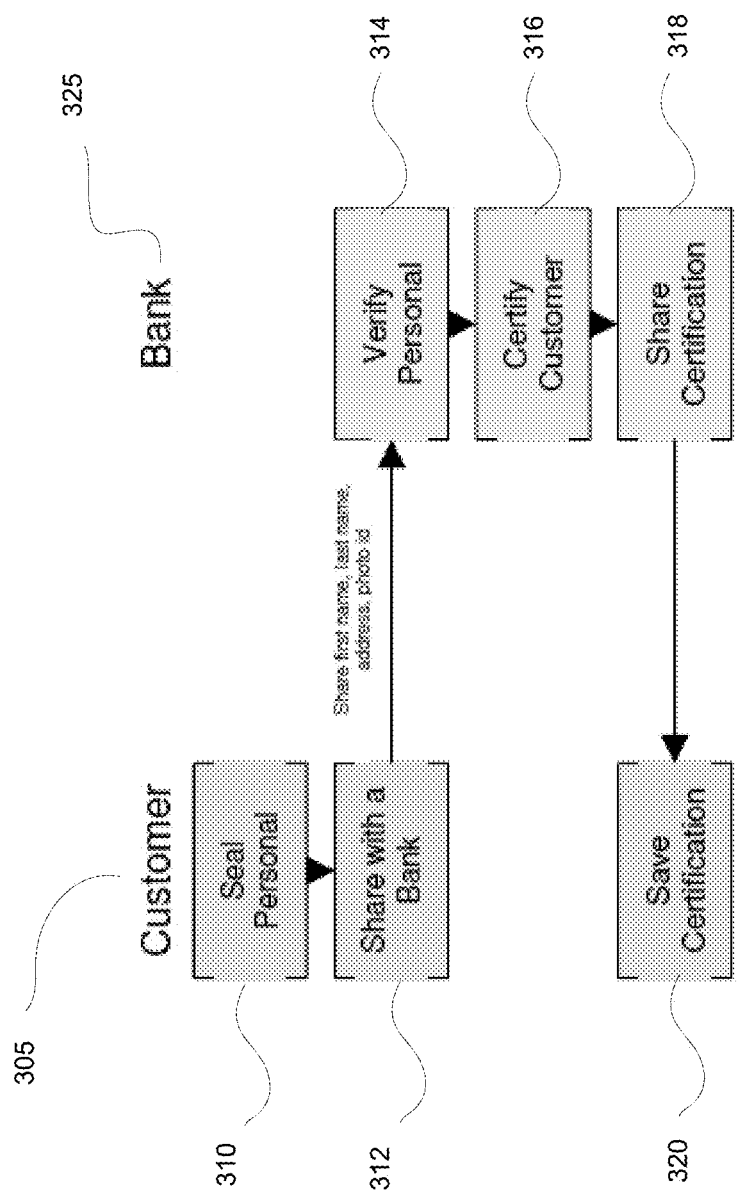
FIG. 3A illustrates one certification use case, wherein an organization certifies personally identifiable information (PII) data provided by a customer, in accordance with one embodiment of the present disclosure.

FIG. 3A illustrates one certification use case, wherein an organization (e.g., bank 325) certifies personally identifiable information (PII) data provided by a customer 305, in accordance with one embodiment of the present disclosure. For example, at 312 the customer 305 provides the bank 325 with a Seal. The PII may have been previously registered at 310 with a blockchain, thereby generating the Seal. After receipt of the data, the bank 325 is configured to certify those fields of the PII (e.g., as presented in a identification card—driver's license, etc.). The Seal is based on and associated with identifying information, such as first and last names, address, photo id, etc. Certification is performed after a verification and/or validation process is performed at 314, such as verifying/validating address information, verifying/validation that the photo id matches the face of the customer 305 through automatic or manual methods, etc. This verification and/or validation step is typically performed by the bank employee at the physical branch of the bank 325 or it can be done digitally using facial recognition and facial comparison engines (these services are readily available as SaaS or on-premise services that can be integrated into server, such as a bank server). As such, after verification and validation of the user data, the bank 325 can certify the PII, and in association the customer at 316. The bank can share the certification at 318, such as with the customer 305. The customer 305 at 320 can store the certification (e.g., certification record), and present the certification along with the PII to a third party to prove to the third party that the PII is reliable, since it has been previously certified.

Figure 3B:
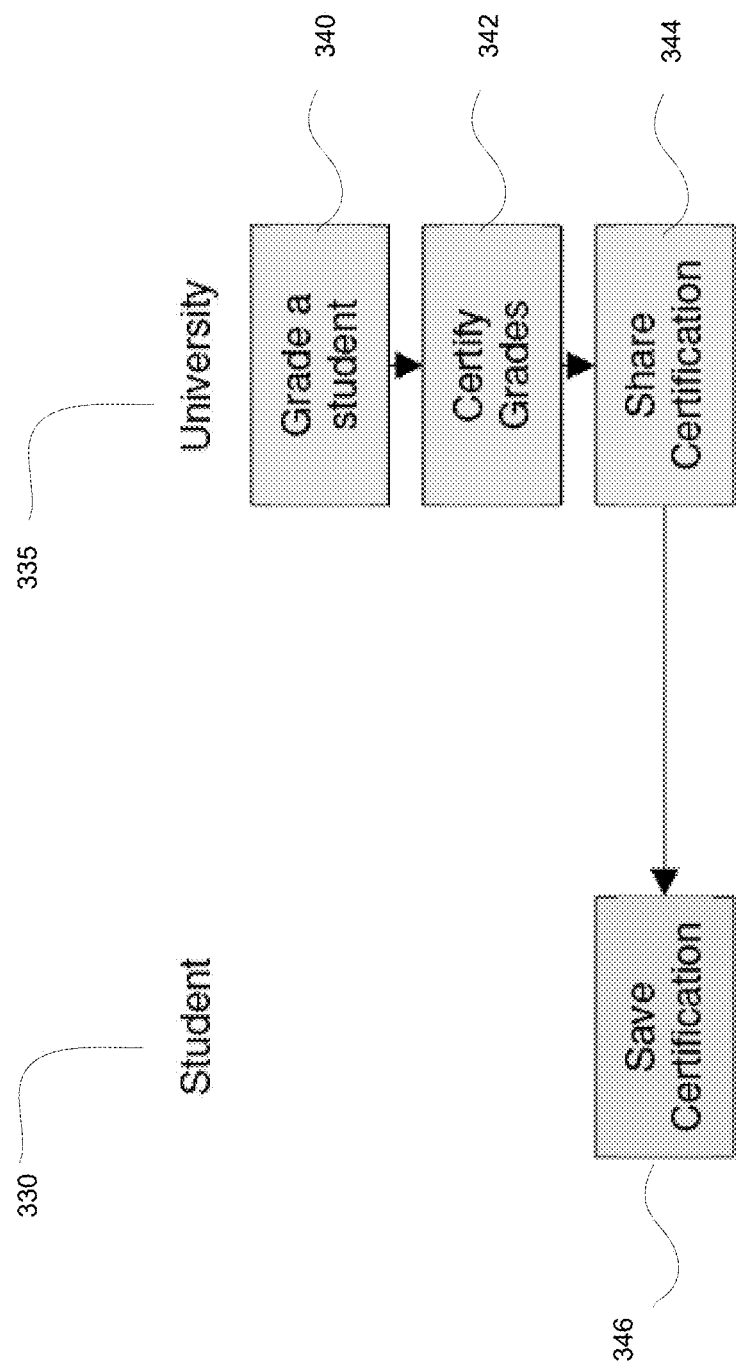
FIG. 3B illustrates another certification use case, wherein a university (e.g., certifying entity) is able to certify grades of a corresponding student (e.g., a user), in accordance with one embodiment of the present disclosure.

FIG. 3B illustrates another certification use case, wherein a university 335 (e.g., certifying entity) is able to certify grades of a corresponding student 330 (e.g., a user), in accordance with one embodiment of the present disclosure. In this case, the university would generate grades for the user at 340. At 342, the university 335 can issue a certification containing the grades. At 344, the university 335 can share the certification along with the grades with the student 330. The student 330 can store the certification (e.g., certification record), which the student 330 can later use it to prove his grades from that university 335. For example, the student 330 can present the certification along with a copy of the grades to a third party to prove to the third party that the grades are reliable, since it has been previously certified by the university 335.

Figure 3C:
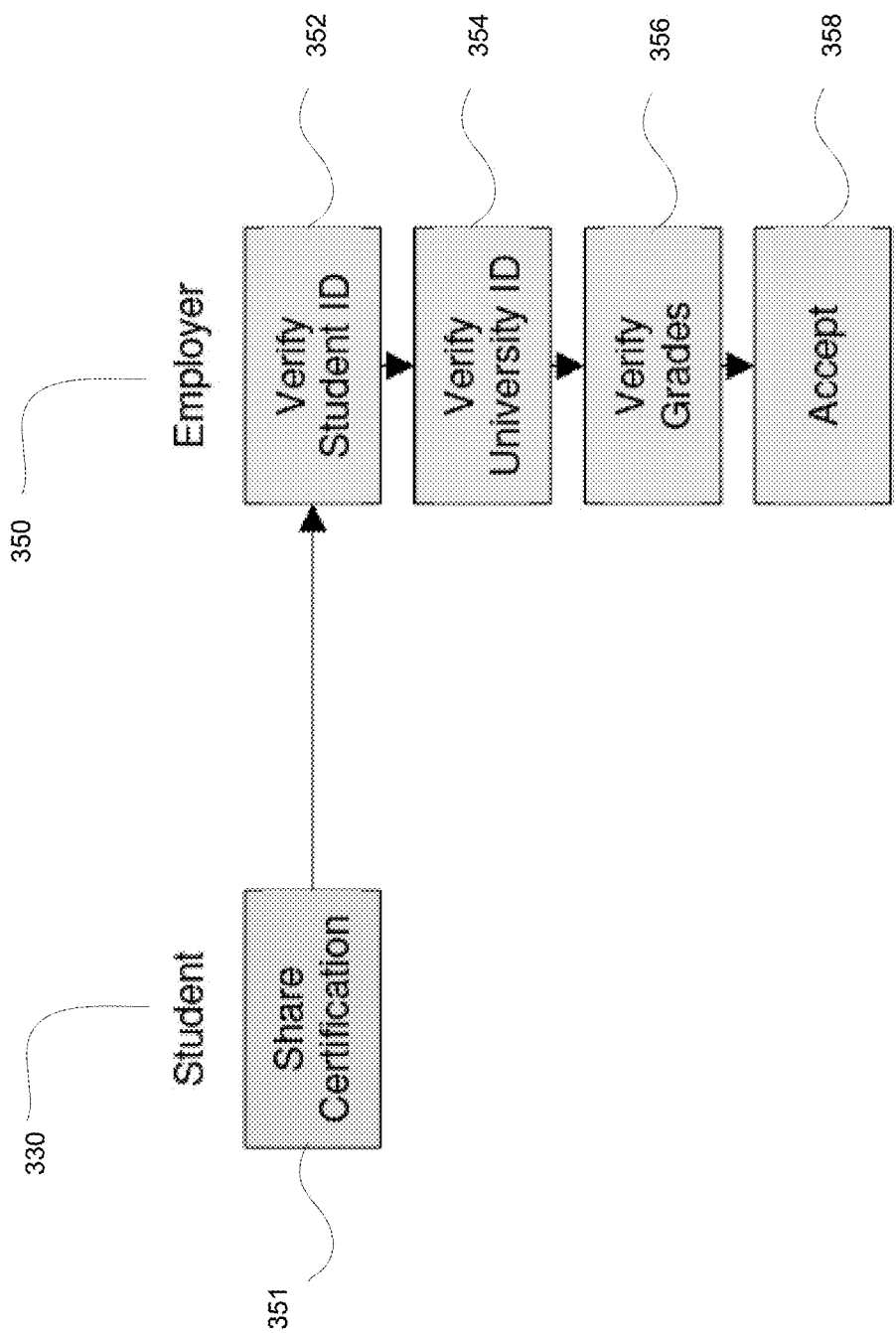
FIG. 3C illustrates a certification use case, wherein the certification is used to publish and/or deliver data between entities, in accordance with one embodiment of the present disclosure.

FIG. 3C illustrates a certification use case, wherein the certification is used to publish and/or deliver data between entities, in accordance with one embodiment of the present disclosure. In particular, a certification can be presented as a proof, and is further verifiable by a third party. As shown, at 351 the student 330 might present his grades (previously certified in FIG. 3B) and various other certifications that certify other data to a potential employer 350. Other data may include a PII (e.g., as presented through a university ID, driver's license, etc.). The PII may include one or more fields, such as name, date-of-birth (DOB), address, image, etc. The employer 350 can verify each of the following is true, as previously described (e.g., verification/validation of the data, and verification of the corresponding certification). For example, at 352, the employer 352 can verify the identity of the student 330 using corresponding identifying information (e.g., driver's license DMV or other government certification) and a corresponding certification. In addition, at 354, the employer 354 can verify the identity of the university using a corresponding university ID and a corresponding certification. Further, at 356, the employer 350 can verify the grades, as previously described in FIG. 3B using a copy of the grades and the corresponding certification. In that manner, the employer can verify the integrity of the data containing the grades as presented by the student, such as to rule out man-in-the-middle spoofs. Additional verification information may be used, including verifying timestamps and signatures, wherein the grades provided by the student 330 can be issued by a university 335 (as verified through signatures of data) and at a particular time (as verified through timestamps). At 358, once the data has been verified through corresponding certifications, the data presented by the student 330 may be accepted.

Figure 3D:
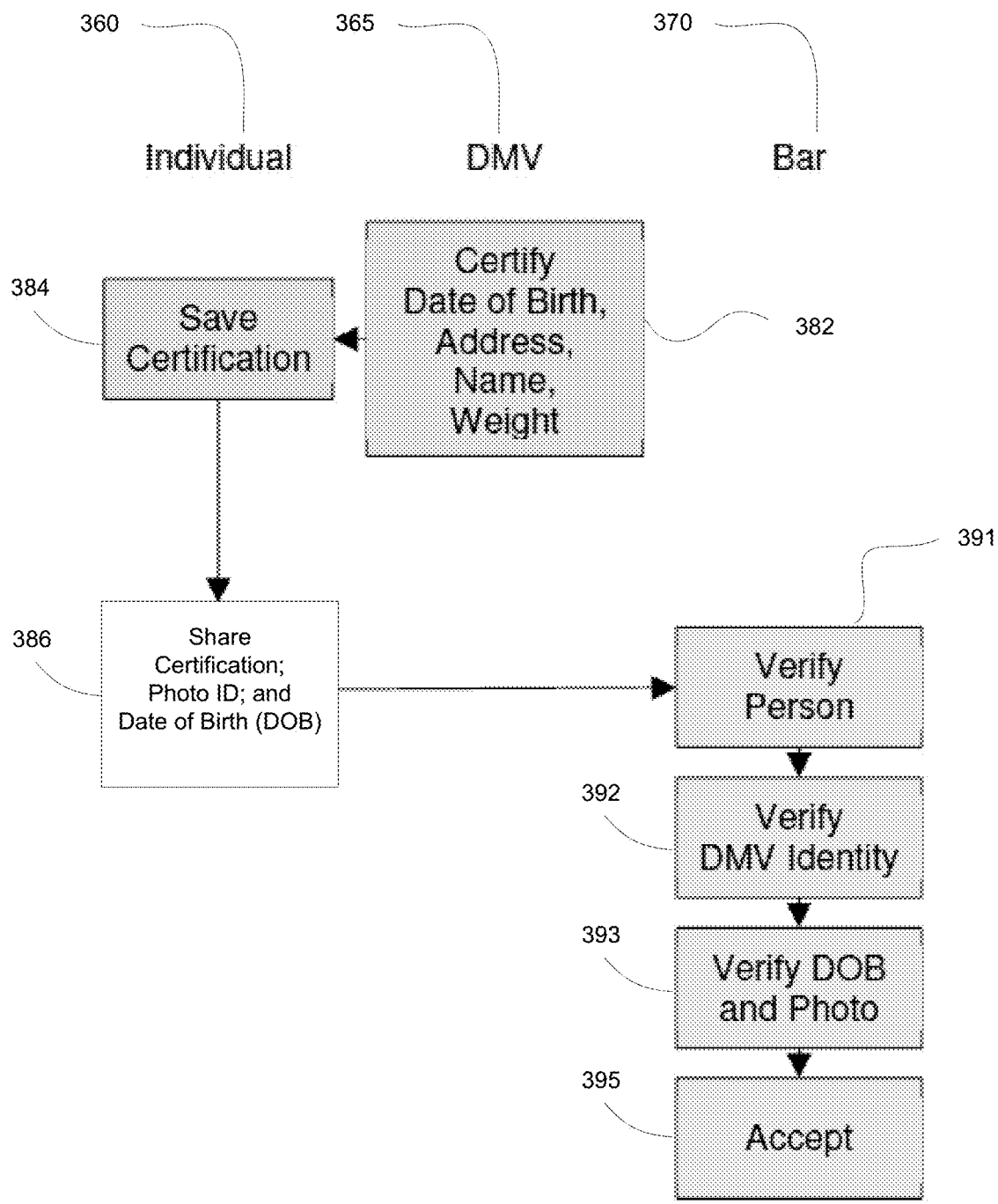
FIG. 3D illustrates a certification use case, wherein a user may only wish to share portions of the data that has been previously registered with a blockchain, in accordance with one embodiment of the present disclosure.

FIG. 3D illustrates a certification use case, wherein a user (e.g., individual 360) may only wish to share portions of the data that has been previously registered with a blockchain, in accordance with one embodiment of the present disclosure. That is, the individual 360 may decide to share only portions of their identity. For example an individual 360 visiting a bar 370 may decide to share only his or her photo identification and DOB. The individual may wish to keep other personal information private. For example, the individual 360 may wish to not expose his or her name, home address, etc.). Embodiments of the present disclosure provide for a certification/verification that supports partial data verification. Specifically, each key/value pair of the PII is individually registered and certified. In particular, partial Seal data registration of personal data (e.g., as presented through an identification card, such as driver's license, etc.) is performed. That is, each key/value pair of the PII is individually signed by the user when registering the corresponding key/value pair with the blockchain, as previously described. For example, each field (e.g., DOB, address, name, height, weight, etc.) of the PII contained in a driver's license of a DMV 365 is registered with a blockchain. Further, certification of the partial Seal data registration is also possible at 382. That is, each of the fields of the PII (e.g., as presented through a university ID, driver's license, etc.) is separately certifiable, such that each field (e.g., name, DOB, address, image, etc.) has a corresponding certification. For example, each registration and corresponding field is signed by the certifying entity to generate a corresponding certification record of the field, as previously described. In addition, the certifications may be partially submitted at 386. For example, at 386, the individual 360 may wish to only present raw data of a photo ID and a DOB, along with the corresponding certifications for those fields to the bar 370. The bar 370 can verify each of the following is true, as previously described (e.g., verification/validation of the data, and verification of the certification). For example, at 391 the bar 370 can verify the person through a visual inspection. In addition, at 392, the bar 370 is able to verify the DMV identity using a corresponding DMV ID and a corresponding certification. Further, at 393 the bar 370 can verify the particular fields of information, such as DOB and photo ID using the corresponding fields of information and corresponding certifications. At 395, once the data has been verified through corresponding certifications, the data presented by the individual 360 may be accepted by the bar 370.

The certification process can be further strengthened through the application of a salt value when generating the certification record, in accordance with embodiments of the present disclosure. A user may wish to keep corresponding certifications issued by one or more certifying entities on behalf of the user (e.g., wherein the certification may be used to log into a web site of a corresponding certifying entity) private. For example, the user may have been issued a certification from a luxury service provider. The user may wish to keep that association private so that an inference that the user is wealthy cannot be openly viewed by just anyone. In another example, the user may have been issued a certification with a particular political organization. The user may wish to keep that association also private so that his or her political views are not discoverable. However, certifications may be discoverable through brute force processes. For example, if a hacker obtains the user PII (e.g., driver's license) that potentially may be used for creating a certification, the hacker may use various combinations of the PII data, hashes of those combinations using appropriate hash algorithms, and public keys of all the certifying entities of interest to discover matches. Once a match is discovered, that validates the certification, and an association may be made between the user and the corresponding certifying entity. Application of a salt value to a corresponding certification would ensure that the certification is obfuscated from discovery, such as through a brute force discovery process. This is because the salt value is virtually impossible to discover without disclosure from a holder of the salt value.

Figure 4A:
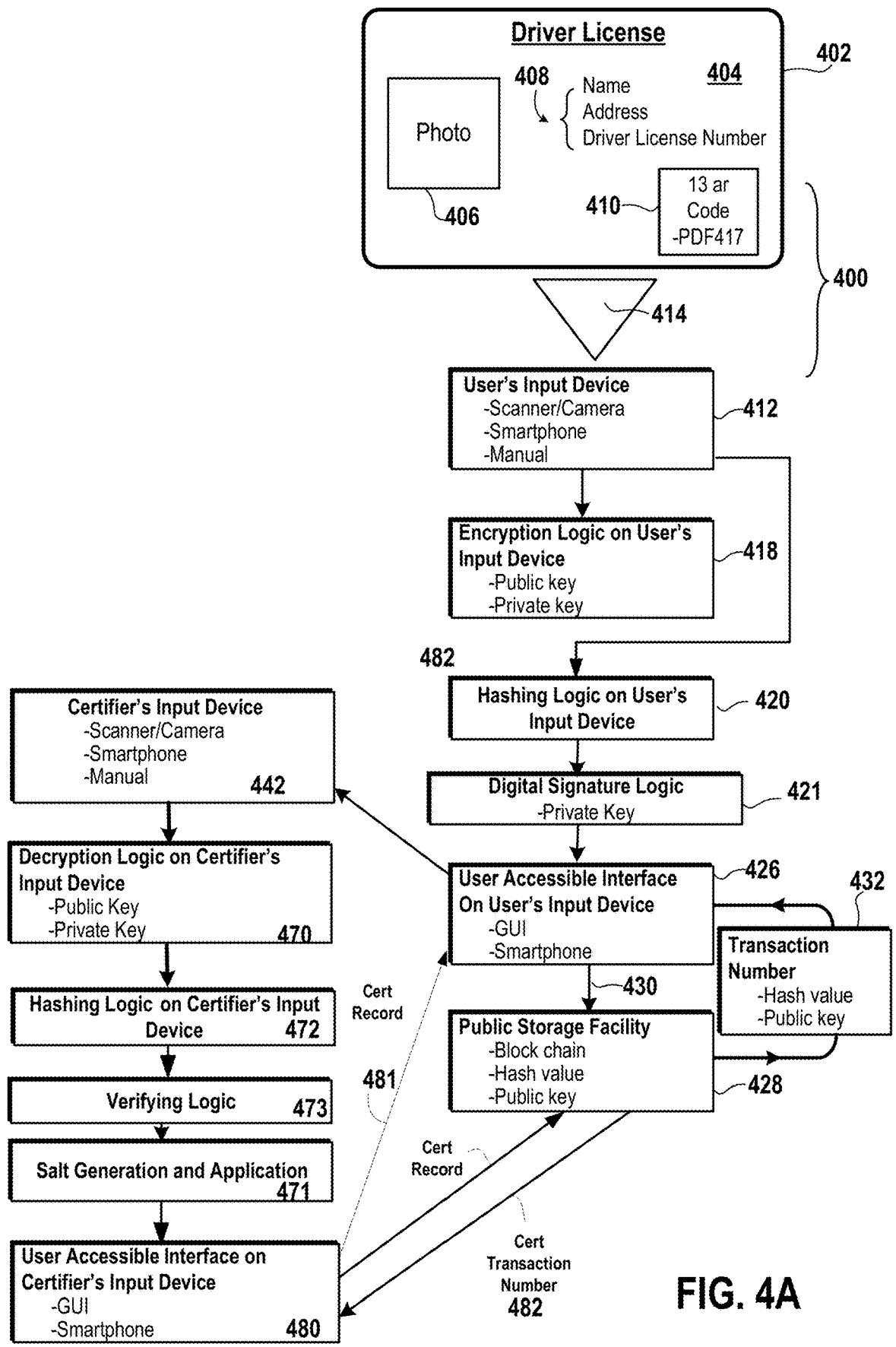
FIG. 4A illustrates a data flow for certifying the registered data using a blockchain, such as for certifying user identification that is registered with an identity manager, wherein the certification is further obfuscated using a salt, in accordance with one embodiment of the present disclosure.

FIG. 4A shows a simplified block diagram for a certification method for managing the identity of a user in a public storage facility 428, wherein the certification is further obfuscated using a salt, in accordance with one embodiment of the present disclosure. By way of example, an identification card 402 may be used. In other embodiments, other forms of identification, which may be digital or non-digital may be used. In the example of the identification card 402, personal data 404 is contained thereon, which identifies the user. The input data can include a photo 406 of the user; the user's name, address and driver license number 408, and/or a bar code 410 or similar computer code for storing, scanning and/or retrieving additional data. Such coding can include PDF417 codes, QR codes, and other such codes. However, it is not necessary to have such code and the identification card may only have human-readable text strings. As noted above, the identification card 402 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 402 can be a government issued form of identification such as a driver license, passport, employee badge, military identification, political documentation, or the like. The identification card 402 can also be a privately issued form of identification such as a student ID, library card, social club card, or any other form of identification issued by a third party.

In one embodiment, as indicated by triangle 414, an input device 412 may be used to input such personal data from the identification card 402 to provide input data. Input device 412 can take many forms. For example, input device 412 can be a digital scanner, digital camera, or smartphone (e.g., with the camera commonly found in smartphones) for reading data from the identification card 402, including any codes appearing on the card 402. The input device 412 can also be a device for manually inputting personal data such as a keyboard, touchscreen, voice recognition device, handwriting recognition device, or other manual input device.

As shown in FIG. 4A, the input data can be optionally encrypted by encryption logic 418 and securely stored. In one implementation, the input data is transferred directly to hashing logic 420, without passing through encryption logic 418. For ease of understanding, the operations of the optional encryption logic 418 will be discussed first, and then the operations processed by the hashing logic 420. As such, the process may proceed directly from receiving the user information via 412 to the hashing logic 420.

The input data collected from the input device 412 (e.g., a user's smartphone) is passed to encryption logic 418 on input device 412. In an example embodiment, encryption logic 418 might include software, firmware, hardware, or any combination thereof, and consist of one or more encryption algorithms, e.g., an RSA encryption algorithm. Encryption logic 418 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. This encrypted data can then be stored locally on the input device 412 for added security. It can then only be accessed with the private key of the user on the input device 412, which might be stored in a more secure part of input device 412, e.g., "the Keychain", if input device 412 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 412. It should be understood that the private key may be stored on another device, but similar or additional security should be processed to ensure that the private key is not compromised.

As noted above, the operations to be performed by the hashing logic 420 can proceed directly after receiving the input data from the input device 412. In this embodiment, the hashing logic 420 is used for hashing the input data (or selected fields of the input data or personal data) to provide or generate a hash value. The hash value is sometimes referred to as "hash data," that is generated by an algorithm. The data that is being hashed can be the original data value (e.g., a date-of-birth), but can optionally appended by a salt, which is a random long and unique string. In an example embodiment, hashing logic 420 might be software, firmware, hardware, or any combination thereof, and consist of one or more hashing algorithms, e.g., a Secure Hash Algorithm (SHA) algorithm. Hashing logic 420 passes the hash value to digital-signature logic 421, which performs a digital signature on the hash value, using the private key on the input device 412. In an example embodiment, digital-signature logic 421 might be a component (or module) of encryption logic 418. In other embodiments, the digital-signature logic 421 may be defined by separate code, firmware, and/or hardware.

In one embodiment, the digital-signature logic 421 then passes the signed hash value and the public key to a user accessible interface 426 (e.g., a graphical user interface or GUI), which might be other software running on the input device 412. In an example embodiment, the user accessible interface 426 might be part of an application or app that includes encryption logic 418, hashing logic 420, and digital-signature logic 421, and/or other modules or code. The user accessible interface 426 might be used by the user to transmit the digitally signed hash value and, optionally, the public key to a public storage facility 428 via a line 430, and receive back from the public storage facility 428 a transaction number 432 corresponding to the transmitted hash value and public key.

In one embodiment, the public storage facility 428 can take the form of a block chain (e.g., in a bitcoin online payment system) or any other public or private distributed database. The public storage facility 428 is connected to a communication link via a line and can be adapted to communicate over a public computer network, the internet, an intranet, an extranet, or any private communication network. Broadly speaking, the public storage facility 428 is accessible by any device that has an Internet connection over a network.

As indicated above, in an example embodiment, the input data (or selected fields of the input data) might be hashed and the resulting hash value might be signed with a digital signature, created using a private key paired with a public key, before transmission, along with, optionally, the public key, from the input device (e.g., a user's smartphone) 412 to the public storage facility 428 for storage. The user accessible interface 426 is thus adapted to "seal" the signed hash value and the public key in the public storage facility 428. In one embodiment, once the hash value, and, optionally, the public key of the user is written to the block chain in a transaction, a later verification may be made if another party is able to hash the same input data.

The user accessible interface 426 (e.g., a GUI) can be controllable by the user of the input device 412 to encrypt and provide the transaction number 432, the input data (or selected fields of the input data), and, optionally, the public key to an input device 442 (e.g., a smartphone) of a certifier. In an example embodiment, the encryption might be performed by the encryption logic 418 using a public key of a certifier paired with a private key of the certifier. Then, coding logic on the input device 412 might code the encrypted transaction number 432, the input data (or selected fields of the input data), and, optionally, the public key into a barcode or QR code and the certifier might use input device 442 to scan the barcode or QR code and decode it to gain access to the encrypted items. Thereafter, the certifier might decrypt the encrypted items using the private key of the certifier and verify them, e.g., using a "verify" function call to an RSA algorithm as explained in further detail below.

Once the certifier's input device 442 receives the barcode or QR code, decoding logic on the certifier's input device 412 might decode the barcode or QR code and decryption logic 470 on the certifier's input device 442 might use the certifier's private key to decrypt the encrypted items. In an example embodiment, decryption logic 470 might be a component (or module) of more general encryption logic.

In one embodiment, the decrypted input data (or selected fields of the input data) and the salt might be hashed into a hash value by hashing logic 472 on the certifier's input device 442, using the same hashing algorithm that was used to create the hash value that was digitally signed by the user. And the decrypted transaction number 432 might be used by a user accessible interface 480 (e.g., a GUI) to access the public storage facility 428 (e.g., the block chain) and retrieve the signed hash value and public key of the user. The retrieved signed hash value, the generated hash value, and the retrieved or obtained public key might then be input to verifying logic 473 for verification (e.g., through a "verify" function call to an RSA algorithm), which outputs a "true" value if the two hash values are the same and the public key is associated with the signature or a "false" value if the two hash values are not the same or the public key is not associated with the signature. In an example embodiment, verifying logic 473 might be a component (or module) of decryption logic 470. In another embodiment, the verifying logic 473 may be a separate module, software, firmware and/or hardware. As indicated above, in an example embodiment, the public key of the user might be obtained from some other source other than the public storage facility 428 (e.g., from the user), in an example embodiment.

Figure 2:
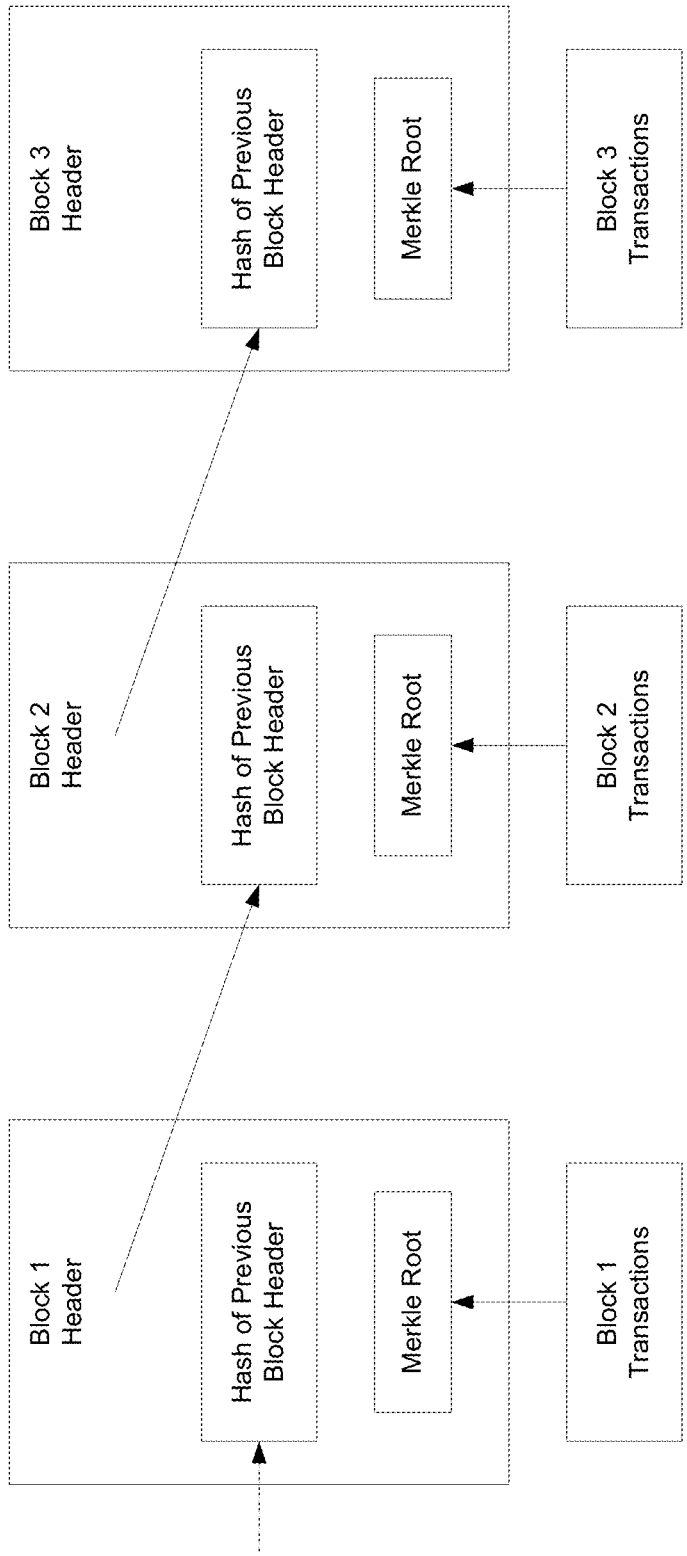
FIG. 2 illustrates the implementation of a blockchain to ensure the integrity of the data embedded within, in accordance with one embodiment of the present disclosure.
Figures 1, 4B:
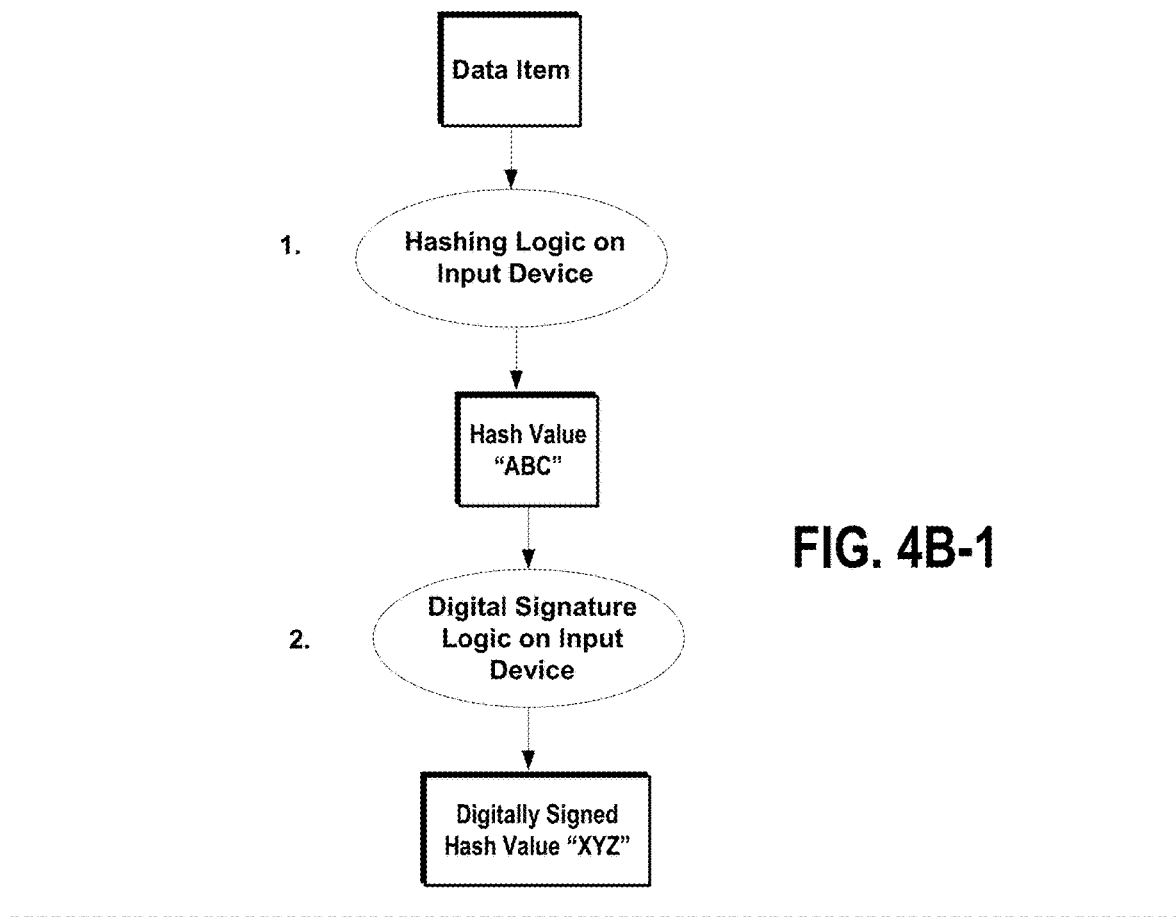
Figures 2, 4B:
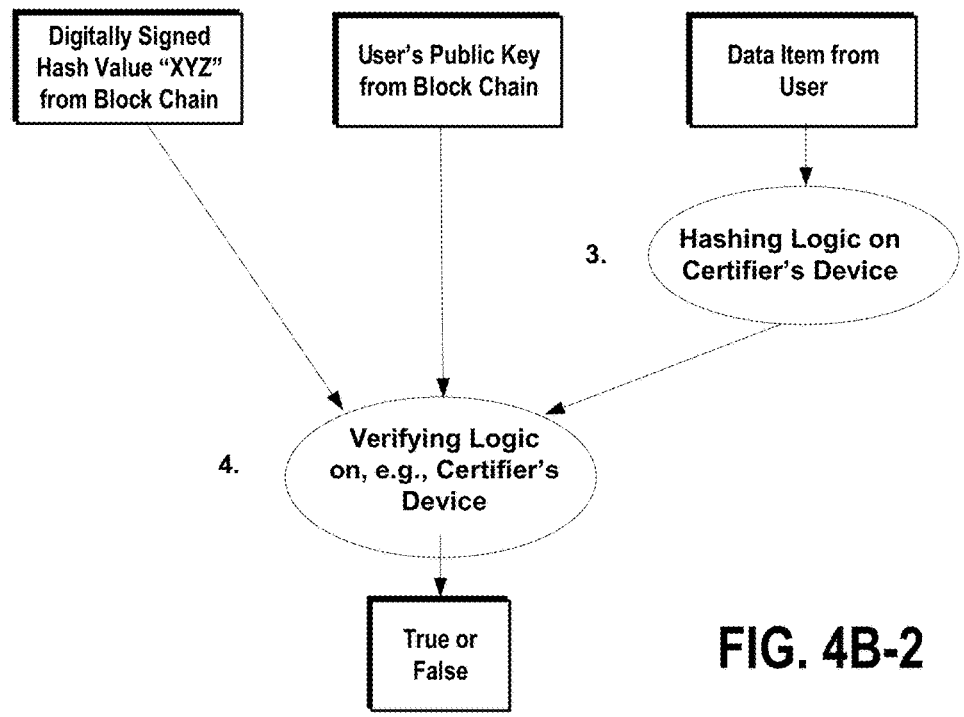

This verification process is depicted in FIGS. 4B-1 and 4B-2. FIG. 4B-1 shows how a digitally signed hash value is created from input data. The input data (or selected fields of the input data) is hashed into a hash value "ABC" by hashing logic 420 on the user's input device 112, in operation 1. Then the hash value "ABC" is digitally signed with the user's private key using digital-signature logic 121 to create digitally signed hash value "XYZ", in operation 2.

FIG. 4B-2 shows how a digitally signed hash value is verified after being retrieved along with the public key of the user from the public storage facility 428. The input data (or selected fields of the input data) is received from the user's input device 412 at the certifier's input device 442 and is hashed into a generated hash value "ABC" using hashing logic 472, in operation 3. Then the signed hash value "XYZ", the generated hash value "ABC", and the user's public key are input to verification logic 473 in operation 4. The verification logic 473 might include a RSA verification algorithm, in an example embodiment. If the hash value in the digitally signed hash value "XYZ" is the same as the generated hash value "ABC" and the digital signature was signed with a private key that is associated with the user's public key, the verification logic 473 returns a value of "true". Otherwise the verification logic 473 returns a value of "false". It should be understood that the verification logic 473 may be executed on any device (e.g., a user's device, a certifier's device, a verifier's device, a third party's device, a commercial entity's device, a private entity's device, etc.), that needs to perform a verification operation.

Upon receipt of a "true" value from encryption logic 470, the certifier might create a certification record that refers to the verification. In an example embodiment, the certification record might include the transaction number 432, the input data (or selected fields of the input data) received from the user, and, optionally, a timestamp. To further obfuscate the certification record, a salt value may also be appended to each field.

In particular, a salt generator 471 generates a salt value for each field, and combines the above information (e.g., transaction number 432, the input data—or selected fields of the input data—received from the user, and, optionally, a timestamp) with the salt value when generating the certification record. For example, the salt value may be appended to the data, or added to the data, or concatenated with the data, etc. The salt value or salt may be unique value, such as a random number generated by a random number generator.

In addition, the certification record (including the salt value) might be hashed and digitally signed by the certifier using a private key of the certifier associated with a public key. Then the certifier might use user accessible interface 480 (e.g., a GUI) to transmit the signed certification record to the public storage facility 428 for storage and receive in return transaction number 482 from the public storage facility 428. In an example embodiment, the certifier might encrypt the certification record with the certifier's public key before transmission to the public storage facility 428, in order to keep the certification record private.

It will be appreciated that the verification process shown in FIGS. 4B-1 and 4B-2 might be used to verify the digital signature on items of data other than the input data (or selected fields of the input data) received by input device 412. In an example embodiment, the item of data that is digitally signed might not be hashed before being digitally signed. In an example embodiment, the verification process shown in FIGS. 4B-1 and 4B-2 might be used to verify a digitally-signed hash of a document other than an identification card, e.g., a digitally-signed certification as described above or a digitally-signed acknowledgement as described below. Or, the same verification process might be used to verify a digitally-signed token (e.g., random number) that is sent by a sender using a secure-envelope process. A secure-envelope process, as described below, might be used instead of, or in addition to, public-key encryption when transmitting data from a user to a certifier, verifier, third party, etc., and vice versa.

In an example embodiment, when using a secure envelope process, a sender might hash a real-time token (e.g., a random number generated by the receiver's remote device) and digitally sign the hashed token using the sender's private key. In an example embodiment, a timestamp might be optionally included with the token. Then the sender might optionally transmit the signed hashed token and, optionally, the public key associated with the sender's private key to a distributed public database for storage, receiving a transaction number in return from the distributed public database. Thereafter, the sender might transmit the signed hashed token or the transaction number and the token to a receiver, e.g., a certifier, a verifier, a third party, etc., optionally, after encrypting the signed hashed token or the transaction number and the token with the receiver's public key. In an example embodiment, the receiver might receive the transaction number and token (optionally including the timestamp), decrypt them using the receiver's private key, if necessary, and then use the transaction number to retrieve the digitally signed hashed and, optionally, the sender's public key from the distributed public database. If the signed hashed token was sent instead of a transaction number, that signed hash would be used. The receiver might generate a hash of the token using the same hashing algorithm the sender used. Then the receiver might verify, e.g., using an RSA verify call as described above, that the token in the generated hash is the same as the token in the digitally signed hash token and verify that the digital signature was created with the sender's private key. An RSA verify call may be, for example, processed by verifying logic 473, e.g., to execute a verify operation. In an example embodiment, the token (optionally including the timestamp) might not be hashed before being signed.

Figure 4C:
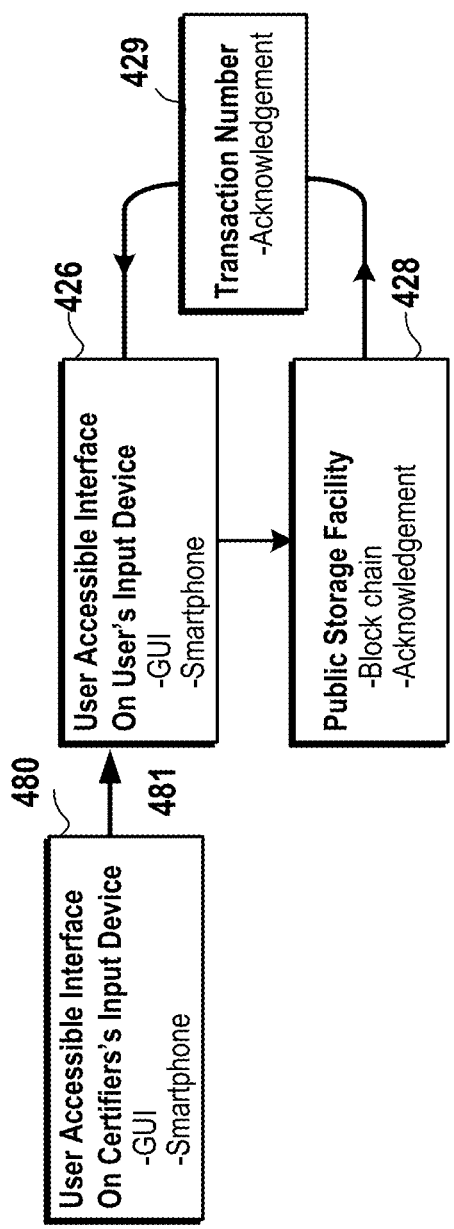
FIG. 4C shows the secure delivery of the certification record from a certifying entity back to a user, in accordance with one embodiment of the present disclosure.

In one configuration, as depicted in FIG. 4C, the certifier might encrypt the certification record and transaction number 482 (e.g., the transaction number the certifier received from the public storage facility 428) with the user's public key and transmit in 481 the encrypted certification record to the user, using user accessible interface 480 (e.g., a GUI). Upon receiving the encrypted certification record, the user might decrypt it using the user's private key. In addition, the salt value may be included in the certification record, and as such upon decryption, the user is aware of the salt value.

Further, the user may create an acknowledgement record that refers to or includes the certification record, and optionally includes a timestamp, in order to link the two records in the public storage facility 428 to facilitate convenient lookup by a third party, if the certification record is verified. Here again, to verify the certification record, the user might hash the certification record (including the salt value) using the same hashing algorithm that the certifier used prior to digital signature by the certifier. The user might use transaction number 482 to retrieve the signed certification record and the certifier's public key from the public storage facility 428. Then the user might verify that the certification record in the generated hash is the same as the certification record in the digitally signed certification record and verify that the digital signature was created with the certifier's private key, e.g., using an RSA verify call as described above.

In an example embodiment, the acknowledgement record might include the certification record, the transaction number 482, and optionally, a timestamp, and the user might digitally sign the acknowledgement record with the user's private key. Then the user might use user accessible interface 428 (e.g., a GUI) to transmit the signed acknowledgement record and the user's public key to the public storage facility 428 for storage and receive a transaction number 429 in response from the public storage facility 428. In an example embodiment, the user might encrypt the signed acknowledgement record with the user's public key before transmission to the public storage facility 428 in order to keep the acknowledgement record private.

Figure 5A:
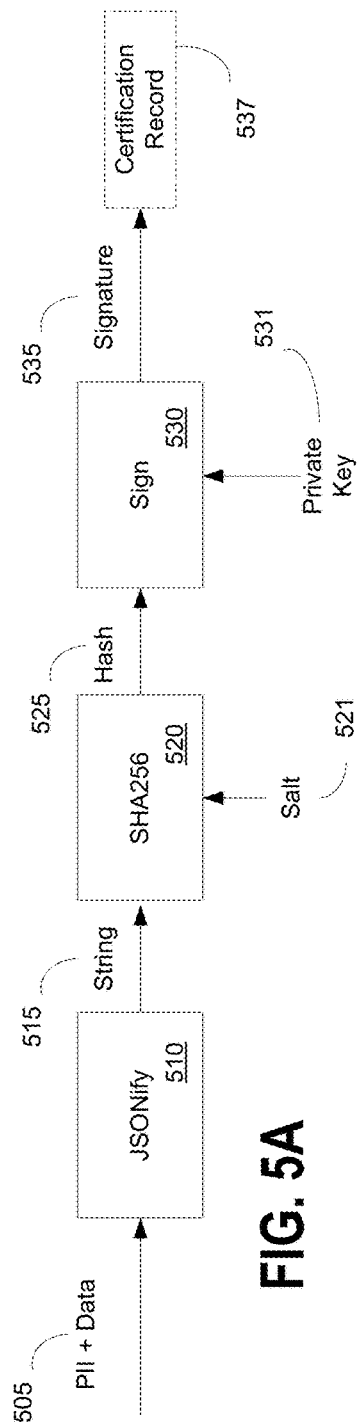
FIG. 5A is a diagram of the generation of a certification record from data taken as a whole, and the application of a salt value to the certification record, in accordance with one embodiment of the present disclosure.

FIG. 5A is a diagram of the generation of a certification record from data taken as a whole, and the application of a salt value to the certification record, in accordance with one embodiment of the present disclosure. In that manner, the certification record may be further obfuscated from discovery, such as through brute force, dictionary, and other discovery tactics on the signed data. As previously described, a certifying entity generates a certification record of data, wherein the data was previously registered to a blockchain. As shown, the data may be PII, such as that obtained from a government agency ID card (e.g., driver's license). The combined data 505 may include the PII and other optional data (e.g., the registration tx-ID of the PII on the blockchain). Block 510 creates a JSON string 515 from the combined data 505, in one embodiment, though other types of data strings may be used in other embodiments. The Name/Value fields (e.g., key/value pairs) can be passed in any number of methods, such as a JavaScript Object Notation (JSON) data structure, name=value strings with a separator, or any other structural form that passes the data. The JSON string 515 may include a universal unique identifier (e.g., registration tx-ID that is generated by the client), a timestamp representing the time the record was created, and other data, in one embodiment. The JSON string 515 and a unique salt value 521 are combined (e.g., appended to, concatenated, added, etc.) and hashed using a hash algorithm 520 (e.g., SHA256) to generate a hashed value 525 (that includes the salt value). Thereafter the hashed value 525 is signed with the private key 531 of the certifying entity to generate a signed value 535. As previously described, the signed value may comprise or form part of a certification record 537 that may be stored to a blockchain.

For verification, a holder of the certification record along with the corresponding salt value, may present and/or share both pieces of information to a third party. As such, the third party may perform a verification process to verify the original data (also presented) that was certified by performing a signature verification process, as previously described.

In the example of FIG. 5A, the data obtained from the input data (e.g., the PII from the driver's license) is treated as a whole unit of data. That is, in one embodiment, in order to ensure the consistency and ownership of the data, certifying entities may be configured to sign the entire certification string when generating a corresponding certification record. That is, the certification record is signed and can be used to verify the original data that has been certified. In this manner, the certifying entity is able to prove the ownership of the entire string, and to ensure that the certification record has not been tampered with.

Figure 5B:
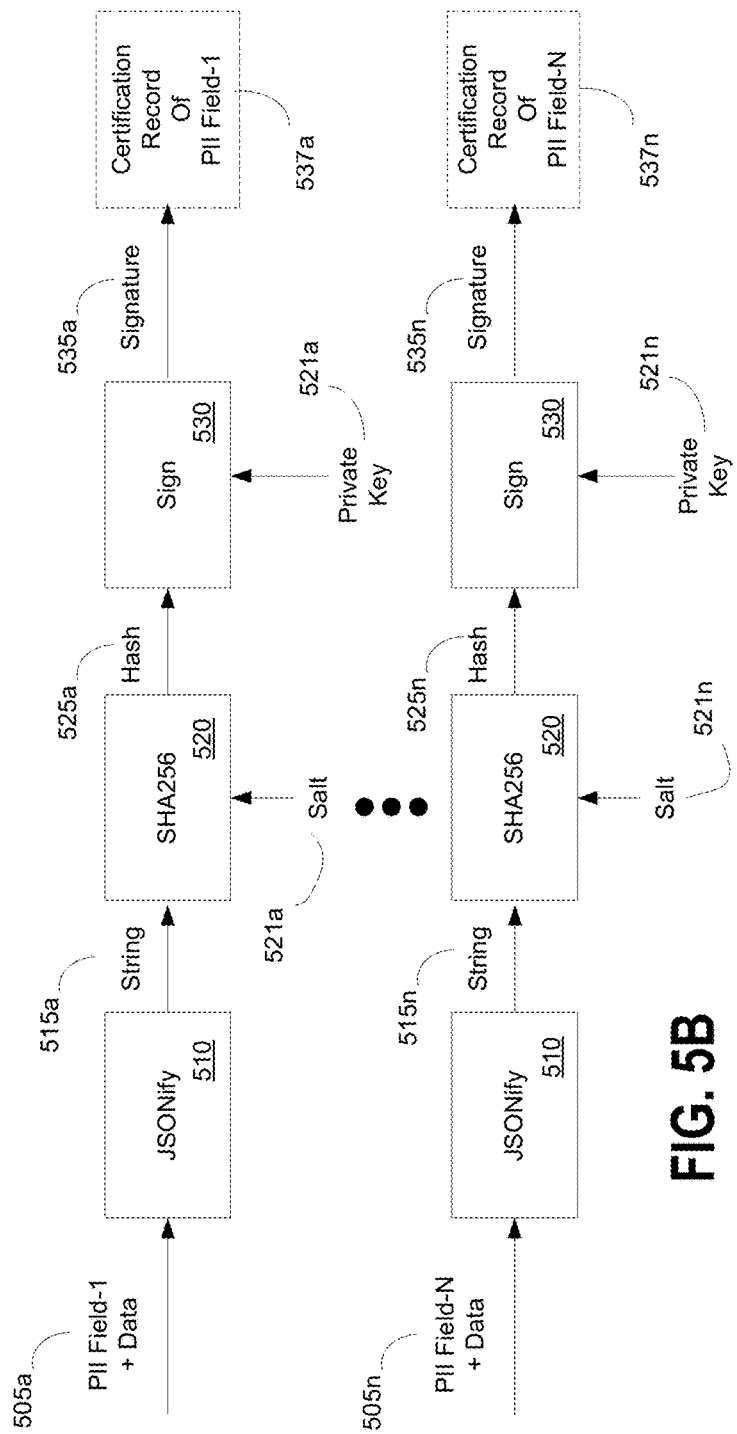
FIG. 5B is a diagram of the generation of a plurality of certification records from data that is parsed into multiple fields, and the application of corresponding salt values to the certification records, in accordance with one embodiment of the present disclosure.

FIG. 5B is a diagram of the generation of a plurality of certification records from data that is parsed into multiple fields, and the application of corresponding salt values to the certification records, in accordance with one embodiment of the present disclosure. In that manner, each of the certification records corresponding to fields may be further obfuscated from discovery, such as through brute force discovery tactics. For instance, each certification record corresponds to a data field (e.g., obtained from a map of key/value pairs) representing unsolicited data being certified. Each key/value pair may be signed by a certifying entity to generate a corresponding certificate record, which can be used to verify the original data.

Closely following FIG. 5A, a certifying entity generates a plurality of certification records of data based on the fields. Each of the fields of the data was previously registered to a blockchain, and as such a plurality of registrations (e.g., corresponding registration tx-IDs) were generated. As shown, the fields of data may be independent pieces of PII, such as that obtained from a government agency ID card (e.g., driver's license). Examples of fields are provided, to include: name, address, phone number, height, weight, photo ID, etc. For each field, combined data may include the field of the PII and other optional data (e.g., the registration tx-ID of the corresponding PII field on the blockchain). For example, there may be fields 1-N. As shown, for field 1, the combined data 505a may include field-1 and other optional data (e.g., the registration tx-ID of the PII field-1 on the blockchain). Block 510 creates a JSON string 515a from the combined data 505a. The JSON string 515a and a unique salt value 521a are combined (e.g., appended to, concatenated, added, etc.) and hashed using a hash algorithm 520 (e.g., SHA256) to generate a hashed value 525a (that includes the salt value 521a). Thereafter the hashed value 525a is signed with the private key 531 of the certifying entity to generate a signed value 535a. As previously described, the signed value 535a may comprise or form part of a certification record 537a for PII field-1 that may be stored to a blockchain. Hence, the salt value may be applied to a combination of all fields, or a unique salt value used for each individual field.

This signature process is repeated for each of the fields. For instance, for field N, the combined data 505n may include field-N and other optional data (e.g., the registration tx-ID of the PII field-N on the blockchain). Block 510 creates a JSON string 515n from the combined data 505n. The JSON string 515n and a unique salt value 521n are combined (e.g., appended to, concatenated, added, etc.) and hashed using a hash algorithm 520 (e.g., SHA256) to generate a hashed value 525n (that includes the salt value 521n). Thereafter the hashed value 525n is signed with the private key 531 of the certifying entity to generate a signed value 535n. As previously described, the signed value 535n may comprise or form part of a certification record 537n for PII field-N that may be stored to a blockchain.

Initial Coin Offering

Figure 6:
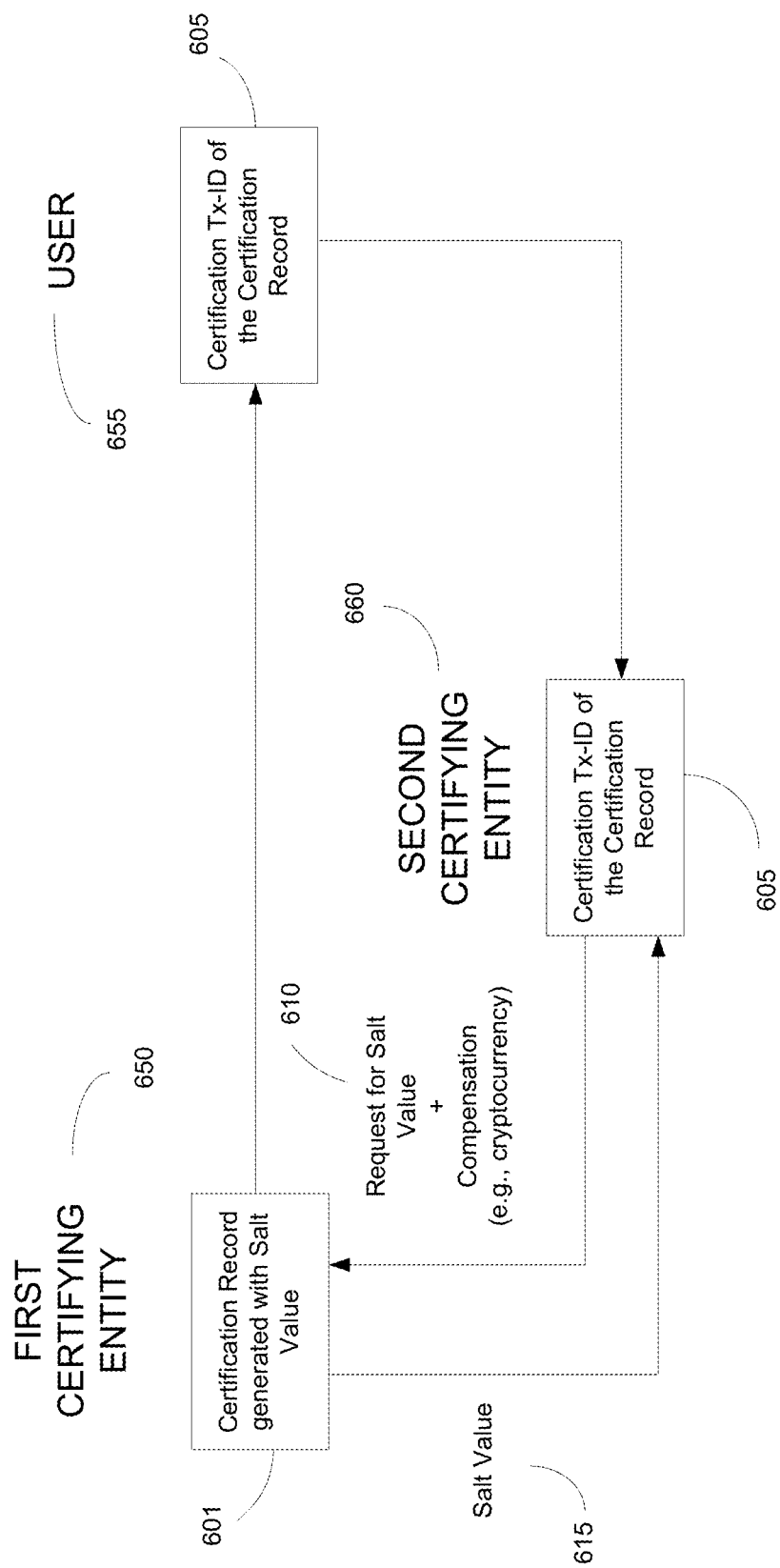
FIG. 6 illustrates the use of salt values to generate compensation for downstream certifications, in accordance with one embodiment of the present disclosure.

FIG. 6 illustrates the use of salt values to generate compensation for downstream certifications, in accordance with one embodiment of the present disclosure. For example, a first certifying entity 650 may wish to leverage the use of generated salt values to control the dissemination of corresponding certification records. As shown, the first certifying entity 650 generates a certification record 601, wherein a salt value 615 was used to obfuscate the certification record 601. The certification record 601 was generated at the request of the user 655. For instance, the user 655 may present the original data (e.g., PII, field of PII, etc.) that was registered (e.g., registration tx-ID) to the first certifying entity 650 for certification. The certification record 605 may be stored to a blockchain, and a certification tx-ID 605 is returned. The certification tx-ID 605 may be the certification or form part of the certification of the original data, in one embodiment.

Further, the first certifying entity may present the certification to the user, such as in the form of the certification tx-ID 605. As such, the user 655 may present the certification along with the original data to a third party for verification of the original data based on the certification. For example, the user 655 may present the original data and the certification tx-ID 605 to a second certifying entity 660, for purposes of obtaining a second certification. The original data was previously certified (e.g., certification tx-ID) by the first certifying entity 650. The certification record 601 stored to the blockchain was generated using a salt value for added security. The second certifying entity 660 may fully verify the certification record 601 only if given the salt value 615.

In one case, where the salt value 615 is freely disseminated, such as when the certifying entity passes the salt value to the user after certification, the second verifying entity is able to then verify the certification record 601 using the methods previously described. In that manner, the second certifying entity 660 may take full advantage of the work and cost of the first certifying entity 650 when originally certifying the original data (e.g., verification/validation and certification). In addition, the second certifying entity 660 may generate a second certification based on the first certification, with minimal cost to the second certifying entity 660. As a result, the cost for certification is fully borne by the first certifying entity 650. The cost may be significant depending on the type of data being certified. For example, the certification process may take anywhere from 5 minutes to 2 days, with an associated ramp in cost.

In another embodiment, the salt value 615 is not freely disseminated. In that case, the certifying entity may leverage the salt value 615 in order to obtain compensation for its release. Without the salt value 615, the second certifying entity 660 cannot verify the certification record 601. Because the first certifying entity 650 controls the salt value 615, the second certifying entity 660 sends a request 610 to the first certifying entity 650 for the salt value 615. The request 610 includes compensation in return for the salt value 615. For instance, the compensation may be in the form of a cryptocurrency, such as one associated with an initial coin offering (ICO). In return, the first certifying entity 650 sends the salt value 615 back to the second certifying entity 660. In that manner, the second certifying entity can verify the certification record 601 along with the original data. At this point, the overall cost to certify the original data is borne across one or more certifying entities'. Further, revenue may be further generated from the certification of the original data through downstream certification entities. The salt value 615 may also be stored with a service provider or an exchange that performs the exchange of compensation for the salt value on behalf of the first certifying entity 650.

Storing Certification Records in Sidechains

One or more ledgers may be used to publish and verify seals (e.g., registrations of data) and certifications. The ledgers (e.g., blockchains) may be public or private.

In one embodiment, publication may be made to a ledger with unlimited data storage. In that case, the compete seal and certification records may be published in the ledger, and may include for example, data, signature, public keys, timestamps, user ID (e.g., ShoCard ID) of the originator (e.g., registration of the user with the identity manager), and a hash of the data.

In another embodiment, publication is made to ledgers with limited data storage. Depending on the size limitations of the blockchain, one or more subsets of the following may be published: data, signature, public key, timestamp, ShoCardID, hash.

In another embodiment, publication is made to ledgers with very limited data storage. In that case, size limitation only allow extremely low amount of data to be preserved. As such, embodiments of the invention publish a hash of data (e.g., described in the previous paragraph) that may be stored in another location.

Figure 7:
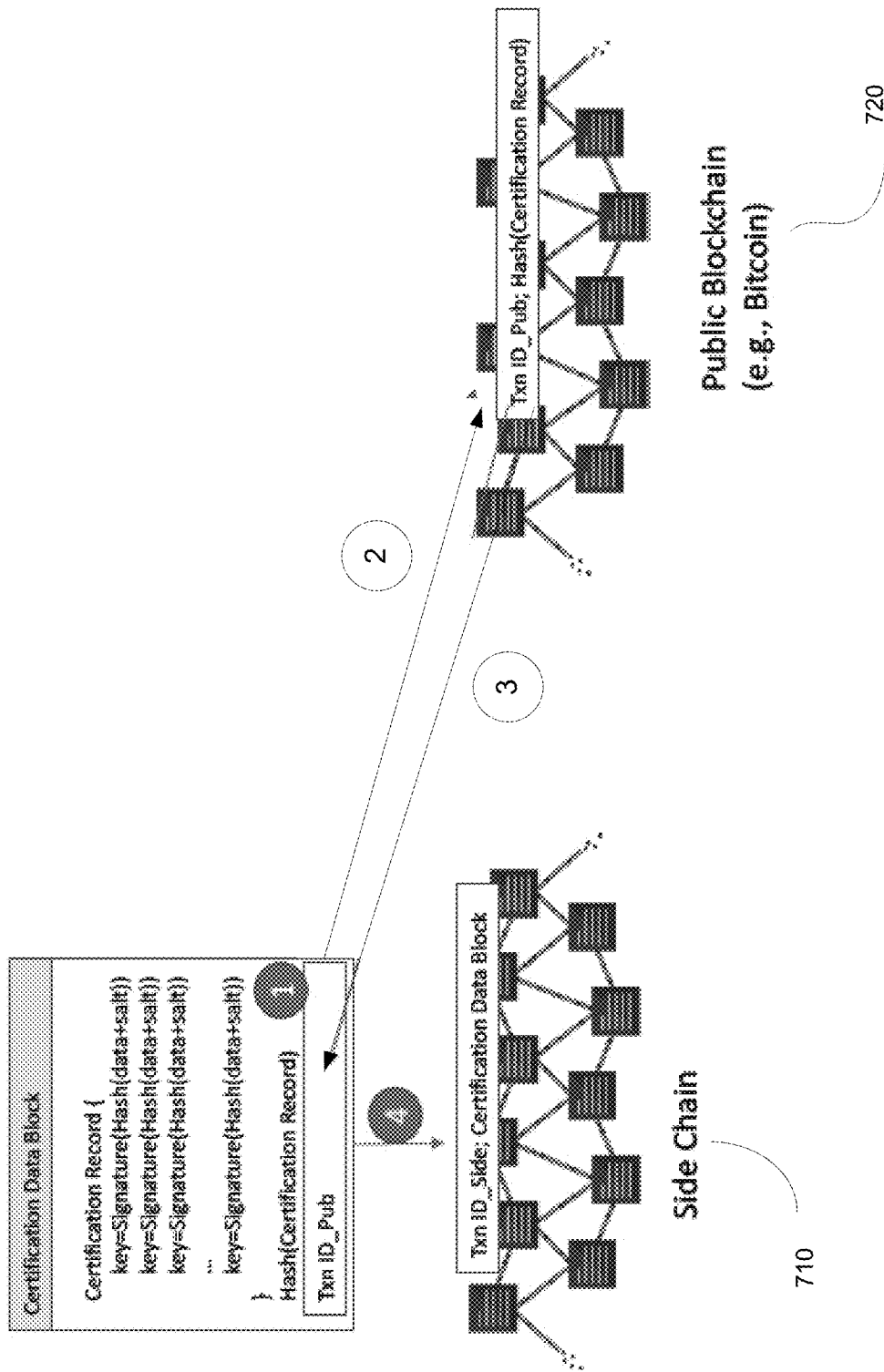
FIG. 7 illustrates the use of a one or more public ledgers to publish and verify seals (e.g., registrations) and certifications to one or more private and/or public ledgers (e.g., blockchains), in accordance with one embodiment of the present disclosure.

In still another embodiment, publication is made to multiple ledgers, including a first ledger (e.g., private or public blockchain) and a sidechain (e.g., public or private blockchain). For example, FIG. 7 illustrates the use of one or more public ledgers to publish and verify seals (e.g., registrations) and certifications to one or more private and/or public ledgers (e.g., blockchains), in accordance with one embodiment of the present disclosure. In particular, a public blockchain 720 is used in combination with a side chain 710.

As previously noted, the blockchain 720 may be public or private. For instance, many banks use a permission based blockchain, which is a form of a private blockchain. Public blockchains are open to anyone, and include Bitcoin blockchain, Ethereum, etc. In addition, the side chain 710 may be a private chain or a public chain (e.g., private turned into a public blockchain). Even if public, the side chain 710 may not be as popular or as widely distributed as major blockchains, such as Bitcoin, Ethereum, etc.

In FIG. 7, the certification data block includes collectively one associated group of data, such as the different fields of a PII of a single user. As such, the certification record may include one or more of hashes of the combination of fields and salts that are signed. For instance, one entry may include a signature of a first hash of a combination of a first field and first salt value, and a second entry may include a signature of a second hash of a combination of second field and a second value, and so on.

At operation 1, a hash of the certification record is performed. As shown, the certification record may include one or more entries of signatures of combinations of hashed fields combined with corresponding salts.

At operation 2, the hash of the certification record is written to a public blockchain, in one embodiment. For example, the public blockchain may be a Bitcoin blockchain, or any other suitable blockchain. In addition, the hash of the certification record may be written to a private blockchain in some embodiments.

At operation 3, the transaction ID of the hash of the certification record stored on the public blockchain is received from the public blockchain. The transaction ID may be named—Txn_ID_Pub.

Furthermore, the transaction ID (e.g., Txn_ID_Pub) is appended to the end of the certification record. As such, this combination of the data, including the certification record, the hash of the certification record, and the appended transaction ID (e.g., Txn_ID_Pub) is collectively called the "Certification Data Block."

At operation 4, the Certification Data Block is written to the side chain 710, and includes the transaction ID (e.g., Txn_ID_Pub). The side chain 710 generates a new transaction ID (e.g., Txn_ID_Side) that has a reference to the hash of its data on the public blockchain (e.g., transaction ID—Txn_ID_Pub).

Figure 8:
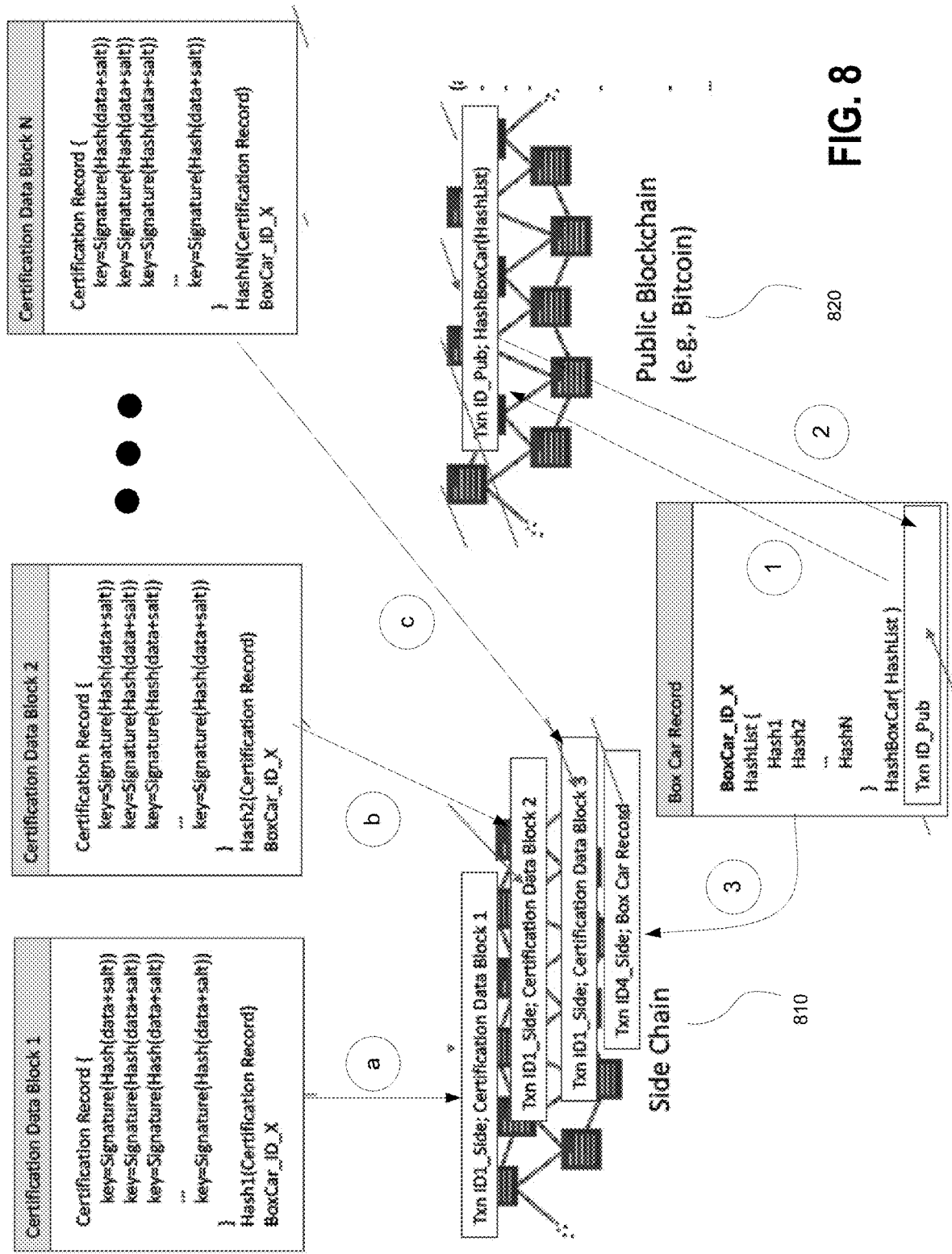
FIG. 8 illustrates the use of a one or more public ledgers to publish and verify multiple seals (e.g., registrations) and/or multiple certifications to one or more private and/or public ledgers (e.g., blockchains), in accordance with one embodiment of the present disclosure.

FIG. 8 illustrates the use of a one or more public ledgers to publish and verify multiple seals (e.g., registrations) and/or multiple certifications to one or more private and/or public ledgers (e.g., blockchains), in accordance with one embodiment of the present disclosure. In particular, a public blockchain 820 is used in combination with a side chain 810.

As previously noted, the blockchain 820 may be public or private. For instance, many banks use a permission based blockchain, which is a form of a private blockchain. Public blockchains are open to anyone, and include Bitcoin blockchain, Ethereum, etc. In addition, the side chain 810 may be a private chain or a public chain (e.g., private turned into a public blockchain). Even if public, the side chain 810 may not be as popular or as widely distributed as major blockchains, such as Bitcoin, Ethereum, etc.

In FIG. 8, collection of certification data blocks is generated and includes Certification Data Block 1, Certification Data Block 2 . . . Certification Data Block N. Each certification data block 1-N may be associated with different fields of a corresponding PII of a corresponding user, for example. As shown, the Certification Record Data Block 1 includes a certification record of one or more of hashes of the combination of fields and salts that are signed. The certification record may be associated with user 1. For instance, one entry may include a signature of a first hash of a combination of a first field and first salt value, and a second entry may include a signature of a second hash of a combination of second field and a second value, and so on.

Similarly, the Certification Record Data Block 2 includes a certification record of one or more of hashes of the combination of fields and salts that are signed. The certification record may be associated with user 2.

This process is continued until a threshold is reached. For example, the threshold may be a maximum number, in one embodiment. The threshold may be a period of time, such as 5 minutes, or 10 minutes, after which the collected Certification Data Blocks are gathered and collected. For example, when N records are written to the Box Car Hash List, or when a timer expires (e.g., every 10 minutes), then the box-car is considered to be full.

In particular, in each of operations a, b . . . and c, corresponding Certification Data Blocks are generated. For example, a hash is created for the corresponding certification record. For Certification Data Block 1, a "Hash 1(Certification Record)" is generated; for Certification Data Block 2, a "Hash2(Certification Record)" . . . and for Certification Data Block N, a "HashN(Certification Record)".

Then, the hash of the corresponding certification record is added to the Box Car Record. Further, the BoxCar ID (e.g., BoxCar_ID_X) is appended to each of the Certification Data Blocks 1-N.

Each of the competed Certification Data Blocks 1-N are then written to the side chain 710. In some embodiments, more than one side chain is used. For example, one side chain may be used for Certification Data Blocks, and another side chain used for Box Car Records.

In addition, at operation 1, the HashBoxCar (HashList) is written to the public blockchain 720.

At operation 2, a transaction ID of that operation is returned (e.g., Txn_ID_Pub). This value is written to the end of the Box Car Record. That is, the HashList is also hashed (e.g., HashBoxCar), and stored to the blockchain 720 and the Box Car Record.

At operation 3, the full Box Car Record is then written to the side chain 710.

Figure 9:
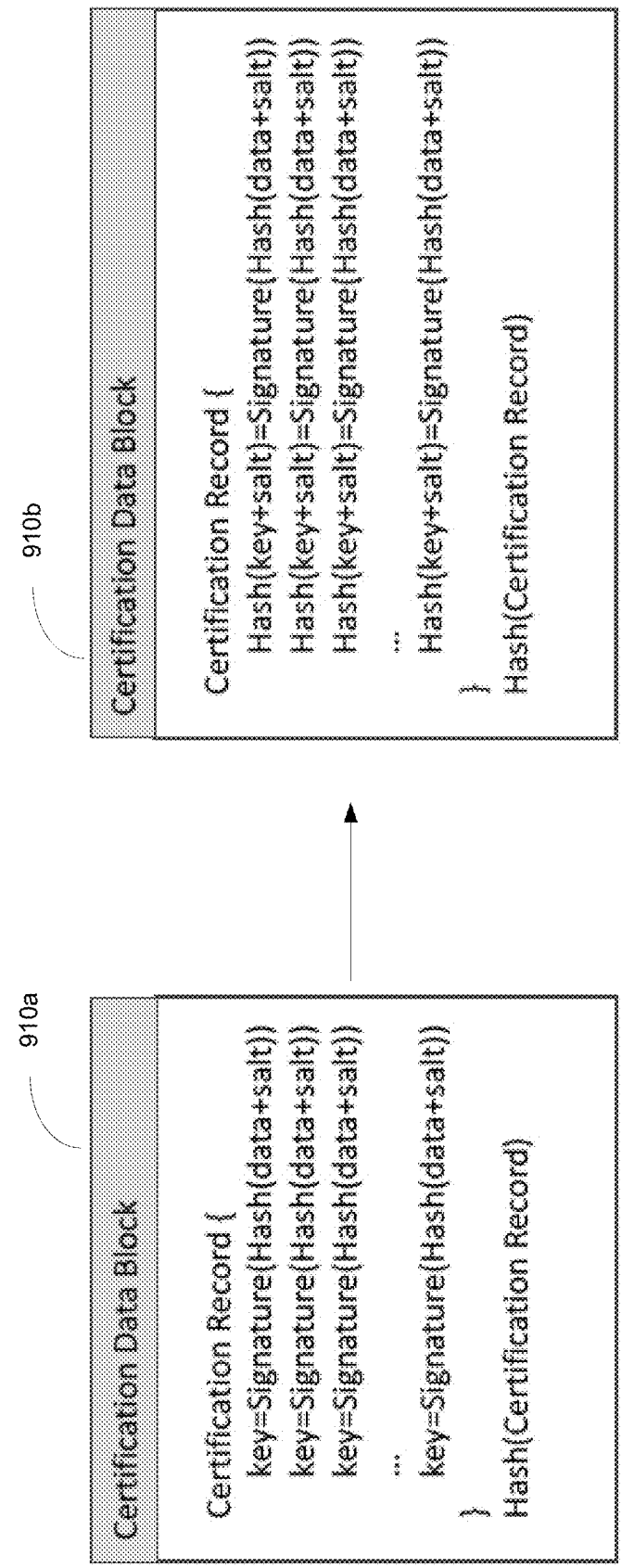
FIG. 9 illustrates the further obfuscation of a certification data block, in accordance with one embodiment of the present disclosure.

FIG. 9 illustrates the further obfuscation of a certification data block, in accordance with one embodiment of the present disclosure. In some implementations, it is desirable to obfuscate the key(s) (e.g., associated with a public/private key pair) in the certification record as well. As shown, the certification data block 910a has keys in clear text. For example, if a certifying entity uses a particular unique key that is in clear text, hackers can look, using brute-force, through all certification records looking for those key matches and using that, they may be able to identify who the certifier is. However, to provide further security these keys cannot be in clear text. For these instances, a hash of the key+salt is used, so that the keys cannot be discoverable through brute-force discovery techniques. As shown, the certification data block 910b has keys that are obfuscated. By obfuscating these records, only the certification records and keys that are desired can be discovered and only when a user explicitly shares the key plus the salt value for the keys.

Figure 10A:
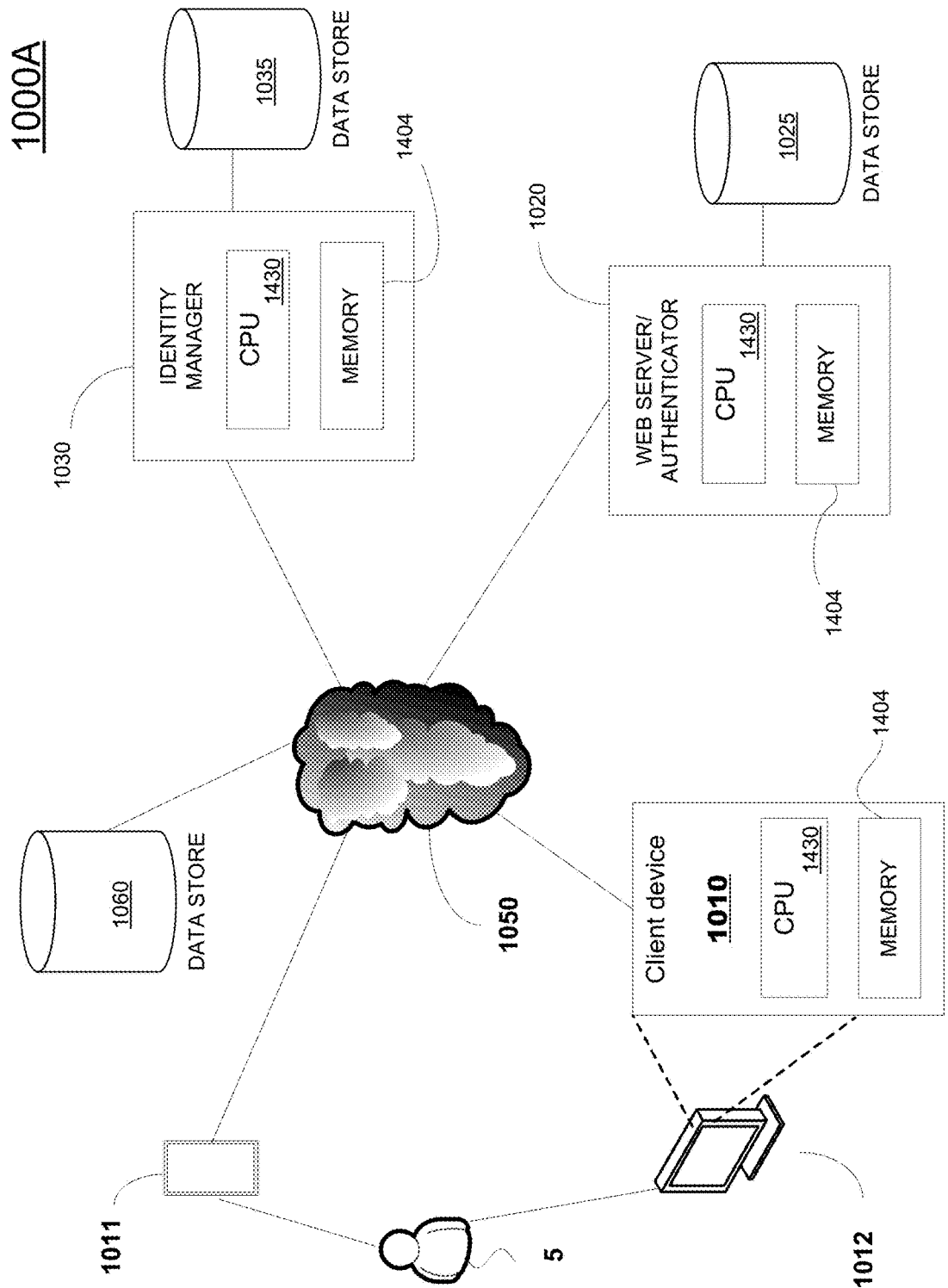
FIG. 10A is a diagram illustrating a system 1000A for performing registration, verification, validation, and certification of data of a user 5, in accordance with one embodiment of the present disclosure.

FIG. 10A is a diagram illustrating a system 1000A for performing registration, verification, validation, and certification of data of a user 5, in accordance with one embodiment of the present disclosure. In particular, user 5 is associated with one or more electronic devices, such as client device 1010 and device 1011. Client device 1010 may include a web browser configurable for communication over a network 1050, such as the internet. For example, client device 1010 and/or device 1011 may allow a user 5 to register data of a user. Client device 1010 and device 1011 can be any type of computing device having at least a memory 1104 and a processor module 1130 that is capable of connecting to the network 1050. Some examples of client device 100 include a personal computer (PC), a game console, a home theater device, a general purpose computer, mobile computing device, a tablet, a phone, or any other types of computing devices.

Identity manager 1030 includes any type of computing device having at least a memory 1104 and a processor module 1130 that is capable of connecting to the network 1050. Data store 1035 may be controlled and/or accessible by identity manager 330. Data store 1035 may be a public or private blockchain. In particular, identity manager 330 may be used, in part, to implement technology to perform registration, validation, and/or certification of raw data, as previously introduced.

Certifying entity 1020 may be configured for certifying the raw data that was previously registered to the blockchain. Certifying entity may include any type of computing device having at least a memory 1104 and a processor module 1130 that is capable of connecting to the network 1050. Data store 1025 may be controlled and/or accessible by certifying entity 1020. For example, data store 1025 may be a public or private blockchain.

Certifying entity 1020 may be configured to provide information and/or services over network 1050. In particular, certifying entity 1020 may be used, in part, to implement technology to perform registration, validation, and/or certification of raw data, as previously introduced. One or more certifying entities may be similarly configured as certifying entity 1020, each of which may be implemented to perform registration, validation, and/or certification of raw data.

A data store 1060 may be configured for storing registration and/or certification data. Data store 1060 may be controlled and/or accessible by one or more certifying entities, such as certifying entity 1020. For example, data store 1025 may be a public or private blockchain.

Figure 10B:
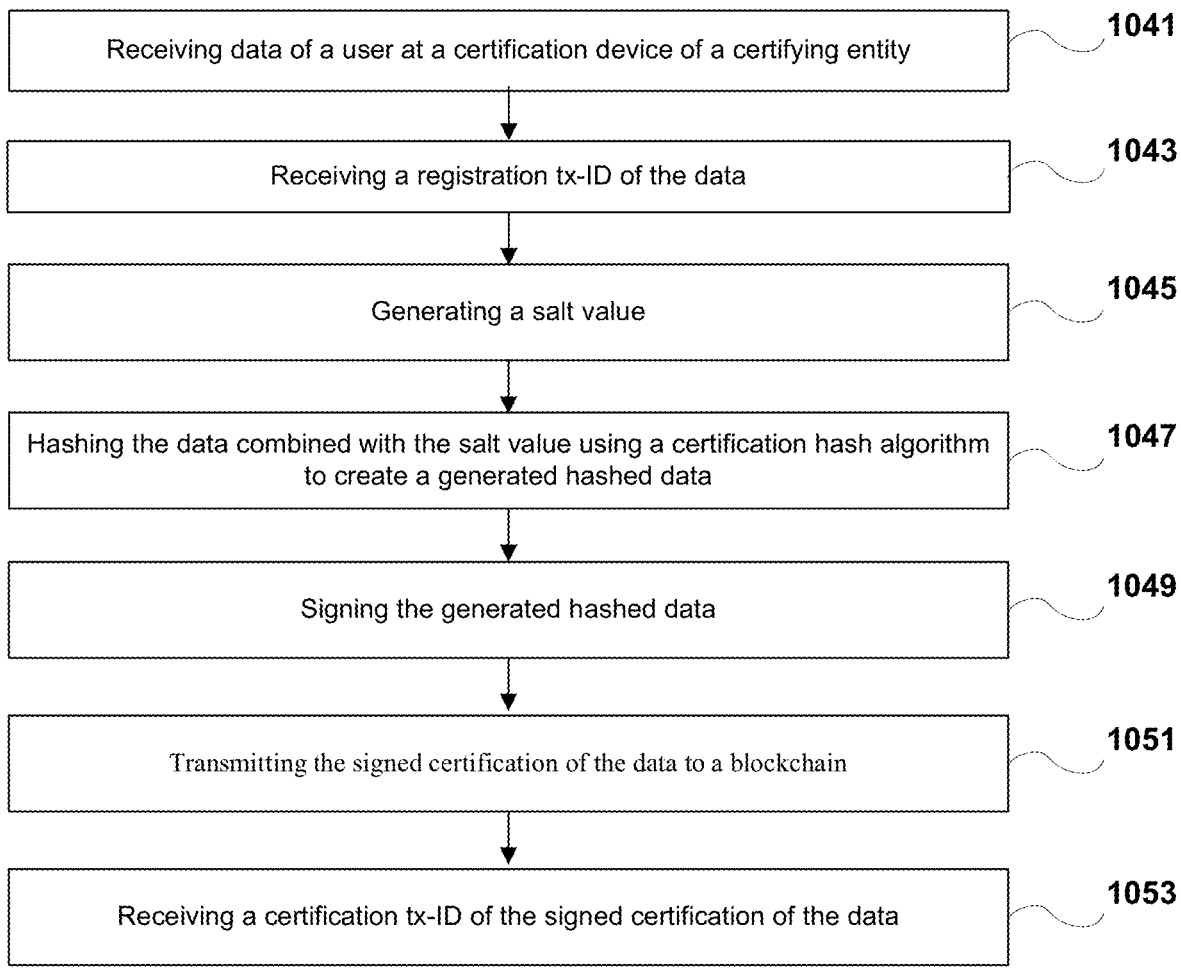
FIG. 10B is a flow diagram 1000B illustrating steps in a method for certification, wherein the certification is performed using a salt value to obfuscate the certification, in accordance with one embodiment of the present disclosure.

FIG. 10B is a flow diagram 1000B illustrating steps in a method for certification, wherein the certification is performed using a salt value to obfuscate the certification, in accordance with one embodiment of the present disclosure. The method outlined in FIG. 10B may be performed by one or more of the entities described in this specification. In one embodiment, the method in flow diagram 1000B is performed by a certifying entity, as previously introduced throughout the specification.

At 1041, the method includes receiving data of a user at a certification device of a certifying entity. The data may be PII, such as that collected from a government issued ID card (e.g., driver's license, passport, etc.). The data was previously registered through a blockchain, and as such a registration tx-ID was generated.

At 1043, the method includes receiving the registration tx-ID of the data. The registration tx-ID is generated from a blockchain in response to receiving and storing a signed hash value of the data for registration. In addition, the signed hash value is signed using a private key of the user. Further, the hash value of the data was generated using a registration hash algorithm.

At 1045, the method includes generating a salt that is unique. The salt value may be a randomly generated number, such as that generated through a random number generator. A salt may also be a GUID (Global Unique Identifier) or a UUID (Universally Unique Identifier) that are commonly used in software technology with their methods available on the world wide web or other identifiers that use a method to generate a unique or random value. The salt value provides additional security for the resulting certification record.

At 1047, the method includes hashing the data that is combined with the salt value using a certification hash algorithm to create a generated hashed data. This may be performed after the verification of the data is performed using original data newly submitted, the optional salt value, a public key of the user, and the record on the blockchain (e.g., the original data signed with the user's private key). In that manner, once the data is verified through its corresponding registration, the certifying entity may choose to certify the data.

At 1049, the method includes signing the generated hashed data (as generated using the salt) using a private key of the certifying entity to create a signed certification of the data. This value may form all or part of the certification record, wherein at 1051, the method includes transmitting the signed certification of the data to a blockchain for storing. In return, at 1053 the method includes receiving a certification tx-ID of the signed certification of the data. As such, a holder of the certification (e.g., certification tx-ID), along with the original data, and salt value, may present such for verification of the original data, based on the certification.

Figure 11:
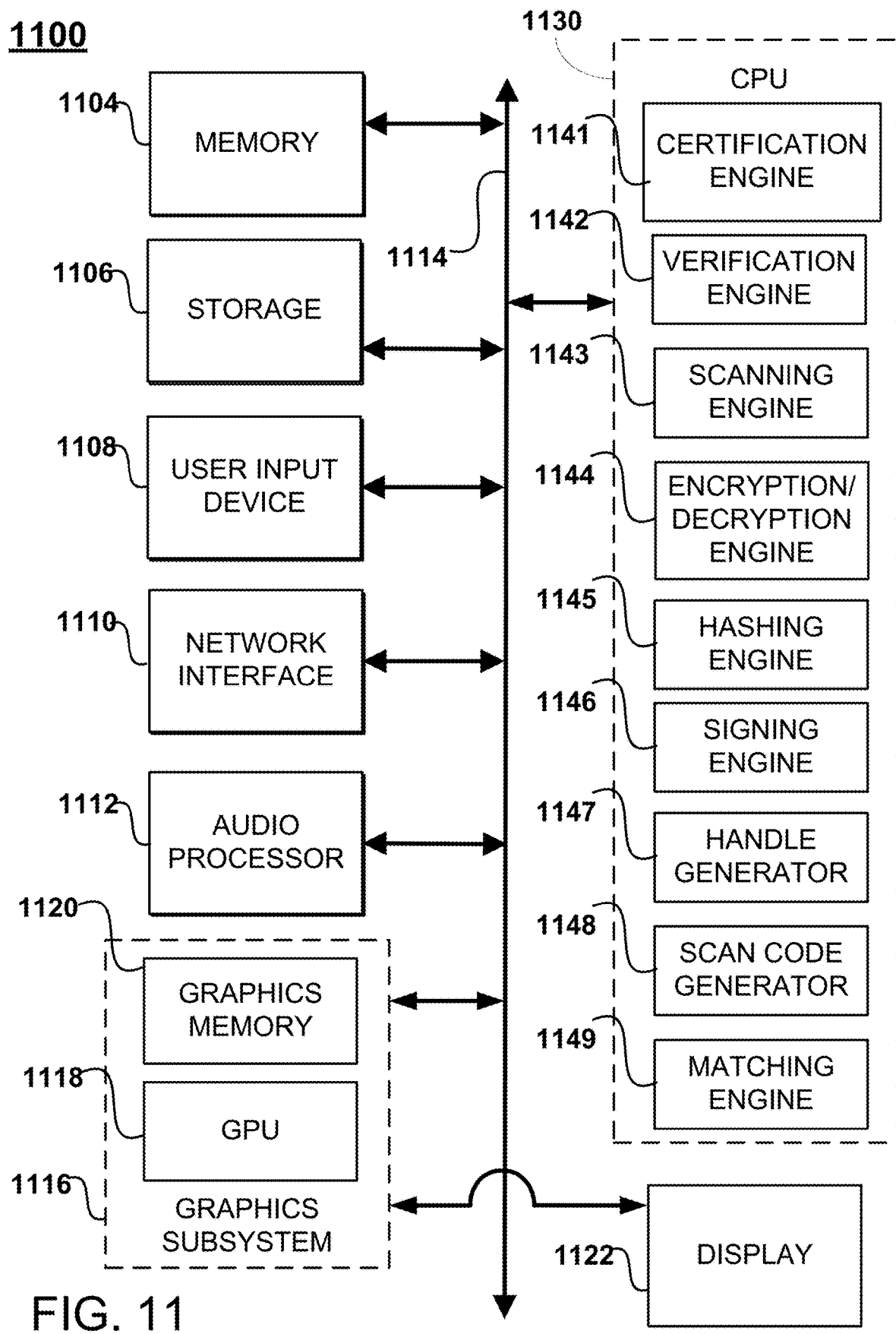
FIG. 11 illustrates components of an example device that can be used to perform aspects of the various embodiments of the present disclosure.

FIG. 11 illustrates components of an example device that can be used to perform aspects of the various embodiments of the present disclosure. For example, FIG. 11 illustrates an exemplary hardware system suitable for implementing a device in accordance with one embodiment. This block diagram illustrates a computer system 1100, such as a personal computer, video game console, personal digital assistant, a mobile phone, or other digital device, suitable for practicing an embodiment of the invention. Computer system 1100 includes a central processing unit (CPU) 1102 for running software applications and optionally an operating system. CPU 1102 may be comprised of one or more homogeneous or heterogeneous processing cores.

In accordance with various embodiments, CPU 1102 is one or more general-purpose microprocessors having one or more processing cores. Further embodiments can be implemented using one or more CPUs with microprocessor architectures specifically adapted for highly parallel and computationally intensive applications. For example, CPU 1130 may be configured to include a certification engine 1141 configured for performing certification of data previously registered to a block chain, a verification engine 1142 for performing verification logic (e.g., verifying data that is signed, registered, and/or certified), a scanning engine 1143 configured for scanning codes (e.g., QR code, scan code, PDF417 code, etc.), an encryption/decryption engine 1144 configured for encrypting and decrypting data using a public/private key pair, a hashing engine 1145 configured for hashing data using any one of a number of well known hashing algorithms, a signing engine 1146 configured for creating a digital signature using a private key, a handle generator 1147 configured for generating a session ID or envelope ID, a scan code generator 1148 for generating a scannable code (e.g., QR code, scan code, PDF417 code, etc.), an a comparator or matching engine 1149 configured for comparing newly captured biometric data and original biometric data.

Memory 1104 stores applications and data for use by the CPU 1102. Storage 1106 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1108 communicate user inputs from one or more users to the computer system 1100, examples of which may include keyboards, mice, joysticks, touch pads, touch screens, still or video cameras, and/or microphones. Network interface 1110 allows computer system 1100 to communicate with other computer systems via an electronic communications network, and may include wired or wireless communication over local area networks and wide area networks such as the Internet. An audio processor 1112 is adapted to generate analog or digital audio output from instructions and/or data provided by the CPU 1102, memory 1104, and/or storage 1106. The components of computer system 1100, including CPU 1102, memory 1104, data storage 1106, user input devices 1108, network interface 1110, and audio processor 1112 are connected via one or more data buses 1122

A graphics subsystem 1114 is further connected with data bus 1122 and the components of the computer system 1100. The graphics subsystem 1114 includes a graphics processing unit (GPU) 1116 and graphics memory 1118. Graphics memory 1118 includes a display memory (e.g., a frame buffer) used for storing pixel data for each pixel of an output image. Graphics memory 1118 can be integrated in the same device as GPU 1116, connected as a separate device with GPU 1116, and/or implemented within memory 1104. Pixel data can be provided to graphics memory 1118 directly from the CPU 1102. Alternatively, CPU 1102 provides the GPU 1116 with data and/or instructions defining the desired output images, from which the GPU 1116 generates the pixel data of one or more output images. The data and/or instructions defining the desired output images can be stored in memory 1104 and/or graphics memory 1118. In an embodiment, the GPU 1116 includes 3D rendering capabilities for generating pixel data for output images from instructions and data defining the geometry, lighting, shading, texturing, motion, and/or camera parameters for a scene. The GPU 1116 can further include one or more programmable execution units capable of executing shader programs.

The graphics subsystem 1114 periodically outputs pixel data for an image from graphics memory 1118 to be displayed on display device 1122. Display device 1122 can be any device capable of displaying visual information in response to a signal from the computer system 1100, including CRT, LCD, plasma, and OLED displays. Computer system 1100 can provide the display device 1122 with an analog or digital signal.

Accordingly, embodiments of the present disclosure disclosing registration, verification, validation, and certification using salt values have been described. While specific embodiments have been provided to demonstrate the use of registration, validation, and certification of data, these are described by way of example and not by way of limitation. Those skilled in the art having read the present disclosure will realize additional embodiments falling within the spirit and scope of the present disclosure.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising operations of:
   receiving data of a user at a certification device of a certifying entity;
   generating a salt that is unique;
   hashing the data combined with the salt to create a generated hashed data;
   generating a certification record based on signing the generated hashed data using a private key of the certifying entity to create a signed certification of the data;
   hashing the certification record;
   transmitting the hashed certification record to a blockchain for storing;
   receiving a certification tx-ID of the hashed certification record;
   generating a certification data block including the certification record and the certification tx-ID;
   storing the certification data block to a side chains;
   receiving a registration tx-ID of the data, wherein the registration tx-ID is generated from a blockchain in response to receiving and storing a signed hash value of the data for registration, wherein the signed hash value is signed using a private key of the user, wherein the hash value of the data is generated using a registration hash algorithm;
   retrieving the signed hash value of the data stored in the blockchain using the registration tx-ID; and
   positively verifying that the generated hash value and the retrieved signed hash value is identical.

2. The method of claim 1, wherein the side chain is a private blockchain.

3. The method of claim 1, wherein the side chain is a public blockchain.

4. The method of claim 1, further comprising: receiving a side tx-ID of the certification data block from the side chain, wherein the side tx-ID includes a reference to the certification tx-ID of the blockchain.

5. The method of claim 1, further comprising: generating a second salt that is unique; hashing the signed certification of the data combined with the second salt; and storing the hash of the signed certification of the data combined with the second salt in the certification record.

6. The method of claim 1, further comprising:
generating a second salt that is unique;
hashing the signed certification of the data combined with the second salt and combined with a public key of the certifying entity; and
storing the hash of signed certification of the data combined with the second salt and combined with the public key of the certifying entity in the certification record.

7. The method of claim 1, wherein the generating the certification includes:
generating a plurality of salts for a plurality of fields of the data;
for each field, hashing the corresponding field combined with a corresponding salt to create a corresponding generated hashed data of the field;
for each field, signing the corresponding generated hashed data of the field using the private key of the certifying entity; and
generating the certification record based on a plurality of signed certifications of the fields.

8. The method of claim 1, wherein the salt is random.

9. A method, comprising operations of:
generating a plurality of certification data blocks, wherein the generating for each certification data block comprises:
receiving data of a user at a certification device of a certifying entity;
generating a salt that is unique;
hashing the data combined with the salt to create a generated hashed data;
signing the generated hashed data using a private key of the certifying entity to create a signed certification of the data that comprises a corresponding certification record;
hashing the corresponding certification record to generate a corresponding hashed certification record;
appending the corresponding hashed certification record to a list of hashes in a box car record;
receiving a corresponding box car tx-ID for the corresponding hashed certification record;
writing the corresponding certification data block and the corresponding box car tx-ID to a side chain;
receiving a registration tx-ID of the data, wherein the registration tx-ID is generated from a blockchain in response to receiving and storing a signed hash value of the data for registration, wherein the signed hash value is signed using a private key of the user, wherein the hash value of the data is generated using a registration hash algorithm;
retrieving the signed hash value of the data stored in the blockchain using the registration tx-ID; and
positively verifying that the generated hash value and the retrieved signed hash value is identical;
reaching a threshold of hashed certification records in the list of hashes;
hashing the list of hashes;
writing the hashed list of hashes to the blockchain;
receiving list tx-ID from the blockchain; writing the list tx-ID to the box car record; and
writing the box car record including the hashed list of hashes and the list tx-ID to the side chain.

10. The method of claim 9, wherein the threshold comprises a maximum number of hashed certification records in the list of hashes.

11. The method of claim 9, herein the threshold comprises a period of time.

12. The method of claim 9, wherein the side chain is a private blockchain.

13. The method of claim 9, wherein the side chain is a public blockchain.

14. The method of claim 9, wherein the generating for each certification data block further comprises:
generating a second salt that is unique;
hashing the signed certification of the data combined with the second salt and combined with a public key of the certifying entity; and
storing the hash of signed certification of the data combined with the second salt and combined with the public key of the certifying entity in the certification record.

15. The method of claim 9, wherein the salt is random.

16. A computer system comprising:
a processor; and
memory coupled to the processor and having stored therein instructions that, if executed by the computer system, cause the computer system to execute a method comprising:
receiving data of a user at a certification device of a certifying entity;
generating a salt that is unique;
hashing the data combined with the salt to create a generated hashed data;
generating a certification record based on signing the generated hashed data using a private key of the certifying entity to create a signed certification of the data;
hashing the certification record;
transmitting the hashed certification record to a blockchain for storing;
receiving a certification tx-ID of the hashed certification record;
generating a certification data block including the certification record and the certification tx-ID;
storing the certification data block to a side chains;
receiving a registration tx-ID of the data, wherein the registration tx-ID is generated from a blockchain in response to receiving and storing a signed hash value of the data for registration, wherein the signed hash value is signed using a private key of the user, wherein the hash value of the data is generated using a registration hash algorithm;
retrieving the signed hash value of the data stored in the blockchain using the registration tx-ID; and
positively verifying that the generated hash value and the retrieved signed hash value is identical.

17. The computer system of claim 16, wherein in the method the side chain is a private blockchain.

18. The computer system of claim 16, wherein in the method the side chain is a public blockchain.

19. The computer system of claim 16, wherein the method further comprises:
receiving a side tx-ID of the certification data block from the side chain, wherein the side tx-ID includes a reference to the certification tx-ID of the blockchain.

20. The computer system of claim 16, wherein the method further comprises:
- generating a second salt that is unique;
- hashing the signed certification of the data combined with the second salt; and
- storing the hash of the signed certification of the data combined with the second salt in the certification record.

21. The computer system of claim 16, wherein the method further comprises:
- generating a second salt that is unique;
- hashing the signed certification of the data combined with the second salt and combined with a public key of the certifying entity; and
- storing the hash of signed certification of the data combined with the second salt and combined with the public key of the certifying entity in the certification record.

22. The computer system of claim 16, wherein the generating the certification record of the method further comprises:
- generating a plurality of salts for a plurality of fields of the data;
- for each field, hashing the corresponding field combined with a corresponding salt to create a corresponding generated hashed data of the field;
- for each field, signing the corresponding generated hashed data of the field using the private key of the certifying entity; and
- generating the certification record based on a plurality of signed certifications of the fields.

23. The computer system of claim 16, wherein in the method the salt is random.

* * * * *